(12) United States Patent
Owa et al.

(10) Patent No.: US 10,525,586 B2
(45) Date of Patent: Jan. 7, 2020

(54) ROBOT

(71) Applicant: Seiko Epson Corporation, Tokyo (JP)

(72) Inventors: Takuya Owa, Shen Zhen (CN);
Masaru Takahashi, Hamamatsu (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/180,133

(22) Filed: Nov. 5, 2018

(65) Prior Publication Data

US 2019/0134809 A1    May 9, 2019

(30) Foreign Application Priority Data

Nov. 6, 2017  (JP) ................................. 2017-213523

(51) Int. Cl.
| | |
|---|---|
| *B25J 9/00* | (2006.01) |
| *B25J 9/04* | (2006.01) |
| *B25J 17/02* | (2006.01) |
| *B25J 19/00* | (2006.01) |
| *G06F 1/26* | (2006.01) |

(52) U.S. Cl.
CPC ............... *B25J 9/0021* (2013.01); *B25J 9/04* (2013.01); *B25J 17/02* (2013.01); *B25J 17/0283* (2013.01);
(Continued)

(58) Field of Classification Search
CPC ........... G05B 2219/45083; G05B 2219/31094; G05B 2219/33337; G05B 2219/34027; G05B 2219/39236; Y10S 901/08; Y10S 901/01; B25J 9/162; B25J 9/042; B25J 9/1612
(Continued)

(56) References Cited

U.S. PATENT DOCUMENTS

| | | | |
|---|---|---|---|
| 4,723,713 A | | 2/1988 | Dahlquist |
| 4,973,215 A | * | 11/1990 | Karlen ..................... B25J 9/04 414/729 |

(Continued)

FOREIGN PATENT DOCUMENTS

| | | |
|---|---|---|
| EP | 2450158 A1 | 5/2012 |
| JP | H05-293788 A | 11/1993 |

(Continued)

OTHER PUBLICATIONS

Extended European Search Report for Patent Application No. EP 18204329.9 dated Mar. 14, 2019 (8 pages).

*Primary Examiner* — Antony M Paul
(74) *Attorney, Agent, or Firm* — Harness, Dickey & Pierce, P.L.C.

(57) ABSTRACT

A robot includes a robot main body including an A-arm which rotates around an A-rotation axis, a B-arm which is cantilevered off the A-arm and rotates around a B-rotation axis, and a C-arm which is connected to the B-arm, to which an end effector is attached, and which rotates around a C-rotation axis. The A-arm includes a first restriction that is not exposed to the outside of the robot main body. The B-arm includes a clamp which is connected to the end effector and restricts a position of a flexible wiring or pipe, a second restriction that is not exposed to the outside of the robot main body and contacts on the first restriction, and a hole through which the wiring or the pipe is inserted. The C-arm includes a through-hole which penetrates the C-arm along the axial direction of the C-rotation axis.

6 Claims, 15 Drawing Sheets

(52) U.S. Cl.
CPC ....... *B25J 19/0025* (2013.01); *B25J 19/0033* (2013.01); *G06F 1/26* (2013.01)

(58) Field of Classification Search
USPC ...... 318/568.11, 568.12, 568.2, 568.21, 625, 318/628, 652, 661, 34, 47, 51, 114, 139, 318/400.01, 700, 701, 727, 799, 800, 801, 318/400.14, 432; 700/245, 261; 901/1, 901/2, 3, 8, 9, 14, 15, 16, 19, 23, 24, 27, 901/28, 30, 32
See application file for complete search history.

(56) References Cited

U.S. PATENT DOCUMENTS

| | | | | |
|---|---|---|---|---|
| 5,155,423 A | * | 10/1992 | Karlen | ............... B25J 9/04 318/568.1 |
| 5,784,542 A | * | 7/1998 | Ohm | ............... B25J 3/04 700/247 |
| 5,828,813 A | * | 10/1998 | Ohm | ............... B25J 3/04 700/260 |
| 9,216,479 B2 | * | 12/2015 | Takahashi | ............ B23K 37/02 |
| 9,770,831 B2 | * | 9/2017 | Sakai | ............ B25J 19/0025 |
| 10,299,868 B2 | * | 5/2019 | Tsuboi | ............ B25J 9/1674 |
| 2015/0246449 A1 | | 9/2015 | Sakai et al. | |

FOREIGN PATENT DOCUMENTS

| JP | H10-166292 A | 6/1998 |
|---|---|---|
| JP | 2015-160305 A | 9/2015 |

* cited by examiner

ROBOT

BACKGROUND

1. Technical Field

The present invention relates to a robot and a robot system.

2. Related Art

In the related art, an industrial robot that performs work to grip a target is known. Such an industrial robot includes, for example, a robot arm including a plurality of arms, and an end effector such as a hand for gripping the target is generally mounted on the tip end of the robot arm.

Here, it is preferable that a wiring and a pipe for driving the end effector are disposed so that the wiring and the pipe can be easily routed from the end effector to the robot arm and do not obstruct work by the end effector. It is desirable that the wiring and the pipe are not easily damaged and long-term reliability is guaranteed.

For example, in JP-A-2015-160305, a robot including an arm, a wrist supported at both ends by the arm, and an end effector connected to the wrist is disclosed, and through-holes for inserting the wiring are formed in the wrist and the arm, respectively. In the robot described in JP-A-2015-160305, the wiring connected to the end effector is routed into a space between the arm and the wrist through the through-hole formed in the wrist and is pulled out to a side wall portion of the arm through the through-hole formed in the arm so that the wiring does not obstruct work.

However, in the robot disclosed in JP-A-2015-160305, although the wiring does not obstruct work, since the wrist is supported at both ends by the arm, it is difficult to route the wiring from the end effector to the side wall portion of the arm. Also, in such a robot, there is a concern that the wiring is damaged by being rubbed with the through-hole formed in the arm depending on an operation of the wrist or the arm.

In general, a robot is provided with a mechanical stopper for regulating an operation range of an arm, but there is also a concern that the wiring is damaged by being caught in the mechanical stopper.

SUMMARY

An advantage of some aspects of the invention is to solve at least a part of the problems described above, and the invention can be implemented as the following application examples or forms.

A robot according to an application example includes a robot main body including a robot arm that includes an A-arm which is rotatable around an A-rotation axis, a B-arm which is cantilevered off the A-arm and is rotatable around a B-rotation axis, and a C-arm which is connected to the B-arm, to which an end effector is attached, and which is rotatable around a C-rotation axis, in which the A-arm includes a first engagement portion, the B-arm includes a clamp that restricts a position of a flexible member including at least one of a wiring and a pipe connected to the end effector and a second engagement portion engaging with the first engagement portion, the C-arm includes a through-hole through which the flexible member is inserted and which penetrates along the axial direction of the C-rotation axis, the robot arm includes a restriction which is configured to include the first engagement portion and the second engagement portion and restricts rotating of the B-arm with respect to the A-arm by engagement of the first engagement portion with the second engagement portion, and the restriction is not exposed to the outside of the robot arm in a state where the A-arm and the B-arm are connected to each other.

According to such a robot, since the C-arm includes a through-hole through which the flexible member can be inserted and the B-arm includes a clamp for regulating a position of the flexible member, it is possible to prevent deflection of the flexible member due to the operation of the robot arm and interference of the flexible member with a peripheral device. Since the B-arm is cantilevered with respect to the A-arm, the flexible member can be easily routed and damage to the flexible member can be reduced. Furthermore, since the restriction that exhibits a function as a so-called mechanical stopper is provided inside the robot arm so as not to be exposed to the outside of the robot arm, damage to the flexible member by the restriction can also be reduced.

In the robot according to the application example, it is preferable that the B-arm includes a hole communicating with the through-hole through which the flexible member is inserted and which is included in the C-arm, and the through-hole included in the C-arm, the hole included in the B-arm, and the clamp are provided side by side along the axial direction of the C-rotation axis.

With this configuration, the flexible member can be easily routed.

In the robot according to the application example, it is preferable that the B-arm includes a first area connected to the A-arm and a second area including the hole, and the first area and the second area are connected so that both ends of the hole open to the outside.

With this configuration, the flexible member can be easily routed.

In the robot according to the application example, it is preferable that the clamp is provided in the first area.

With this configuration, since the position of the flexible member pulled out from the through-hole can be suitably restricted (fixed), it is possible to more effectively reduce deflection of the flexible member.

In the robot according to the application example, it is preferable that the second engagement portion is a projection provided on an inner surface of the B-arm.

With this configuration, it is possible to constitute a restriction which is not exposed to the outside of the robot arm with a relatively simple configuration.

In the robot according to the application example, it is preferable that the first engagement portion is a projection provided on an outer surface of the A-arm.

With this configuration, it is possible to constitute a restriction that is not exposed to the outside of the robot arm with a relatively simple configuration.

In the robot according to the application example, it is preferable to include a control board and a power supply board that supplies electric power to the control board, which are provided in the robot main body.

With this configuration, since the control board having the function of the controller, the power supply board, and the robot main body are integrated, the degree of freedom of disposition of the robot can be made higher than that in the case where the robot main body and the controller are separate bodies.

A robot system according to an application example includes a robot including a robot arm that includes an A-arm which is rotatable around an A-rotation axis, a B-arm which is cantilevered off the A-arm and is rotatable around a B-rotation axis, and a C-arm which is connected to the B-arm, to which an end effector is attached, and which is rotatable around a C-rotation axis, and a control device provided separately from the robot and including a control board and a power supply board for supplying electric power to the control board, in which the A-arm includes a first engagement portion, the B-arm includes a clamp that restricts a position of a flexible member including at least one of a wiring and a pipe connected to the end effector and a second engagement portion engaging with the first engagement portion, the C-arm includes a through-hole through which the flexible member is inserted and which penetrates along the axial direction of the C-rotation axis, the robot arm includes a restriction which is configured to include the first engagement portion and the second engagement portion and restricts rotating of the B-arm with respect to the A-arm by engagement of the first engagement portion with the second engagement portion, and the restriction is not exposed to the outside of the robot arm in a state where the A-arm and the B-arm are connected to each other.

According to such a robot system, it is possible to prevent deflection of the flexible member or interference with the flexible member and the peripheral device due to the operation of the robot arm. Further, the flexible member can be easily routed, and damage to the flexible member can also be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot and a robot system of the invention will be described in detail based on preferred embodiments illustrated in the accompanying drawings.

First Embodiment

Figure 1:
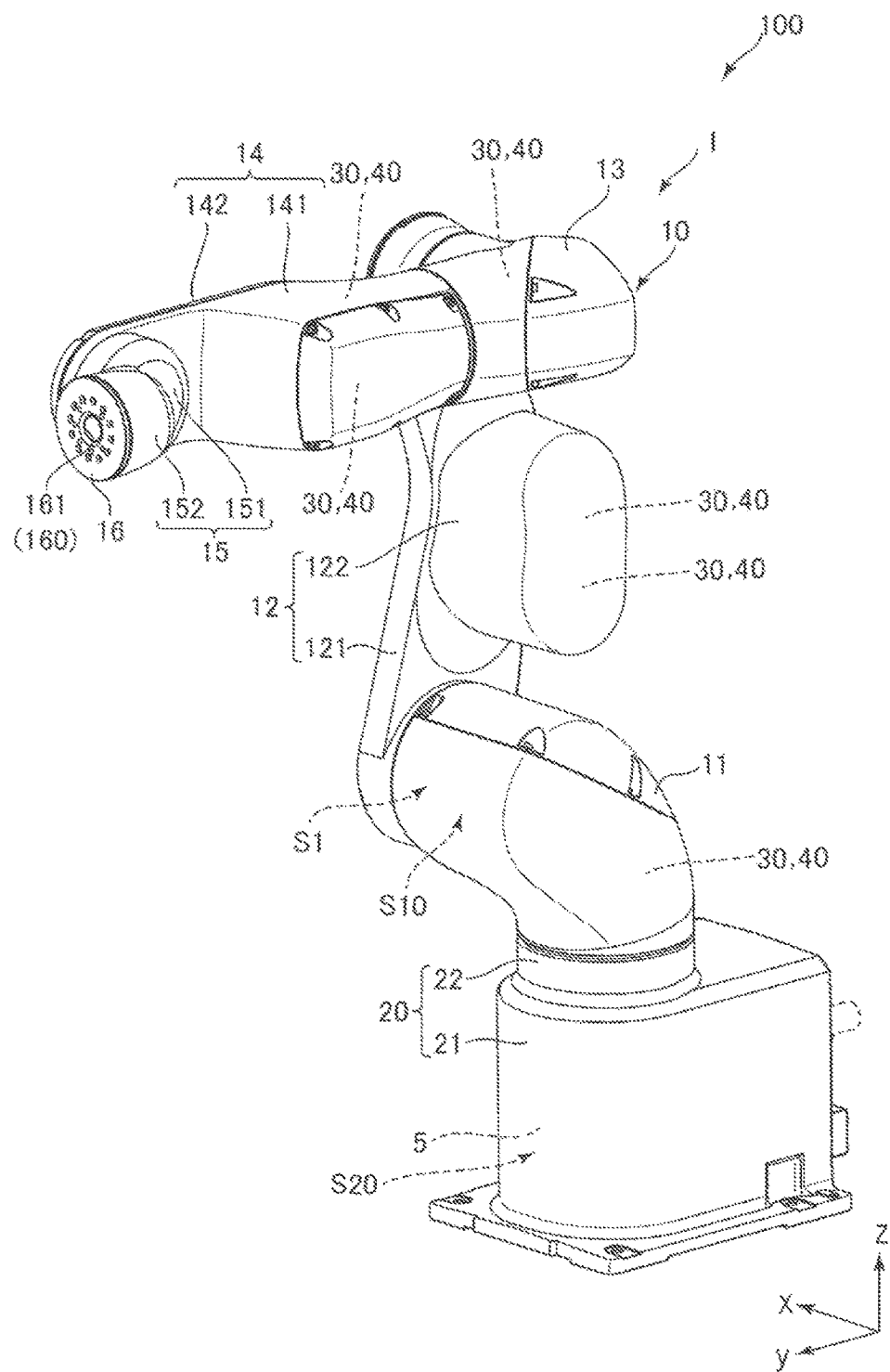
FIG. 1 is a perspective view illustrating a robot according to a first embodiment.
Figure 2:
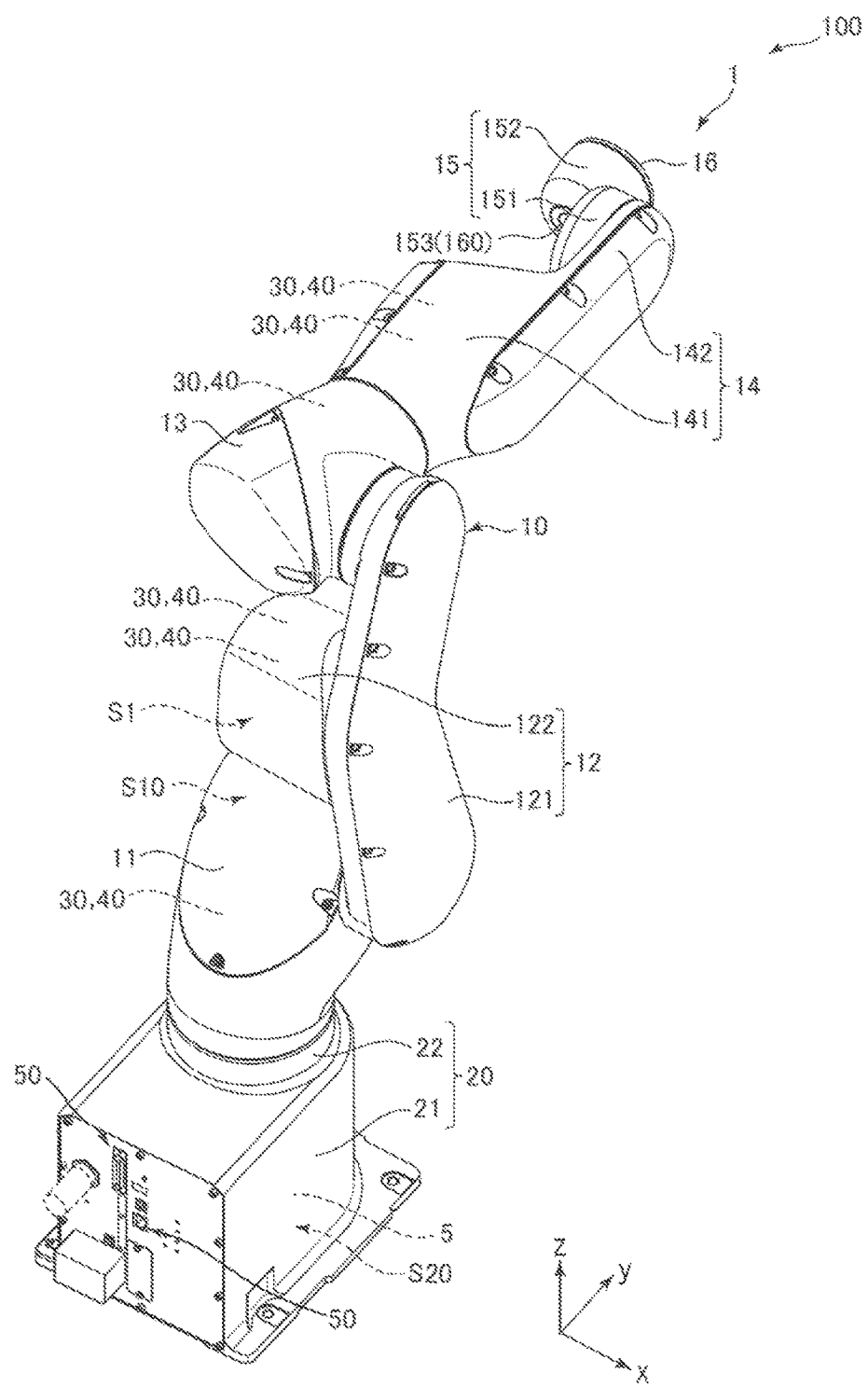
FIG. 2 is a perspective view of the robot illustrated in FIG. 1 as seen in a direction different from that in FIG. 1.
Figure 3:
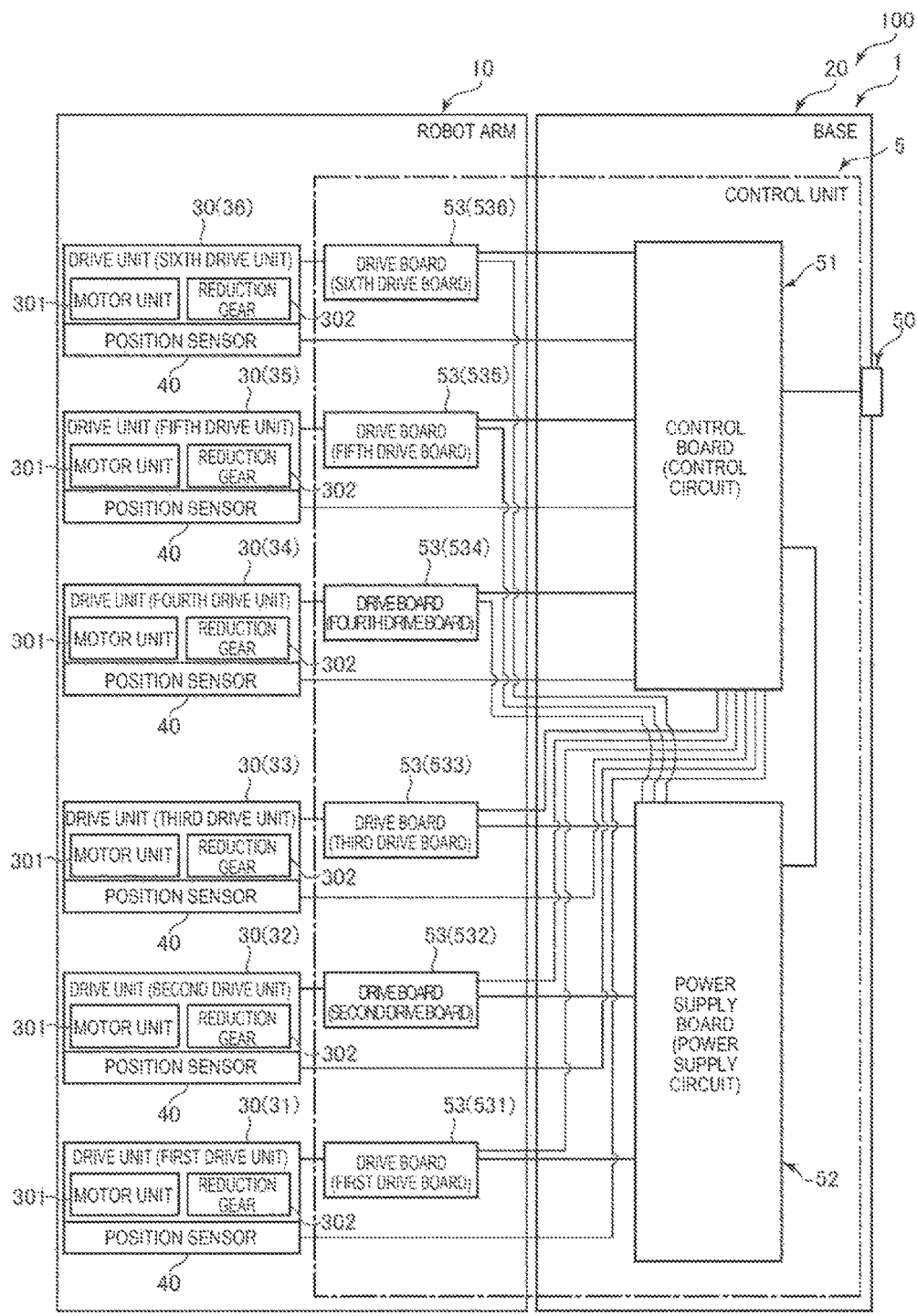
FIG. 3 is a block diagram of the robot illustrated in FIG. 1.
Figure 4:
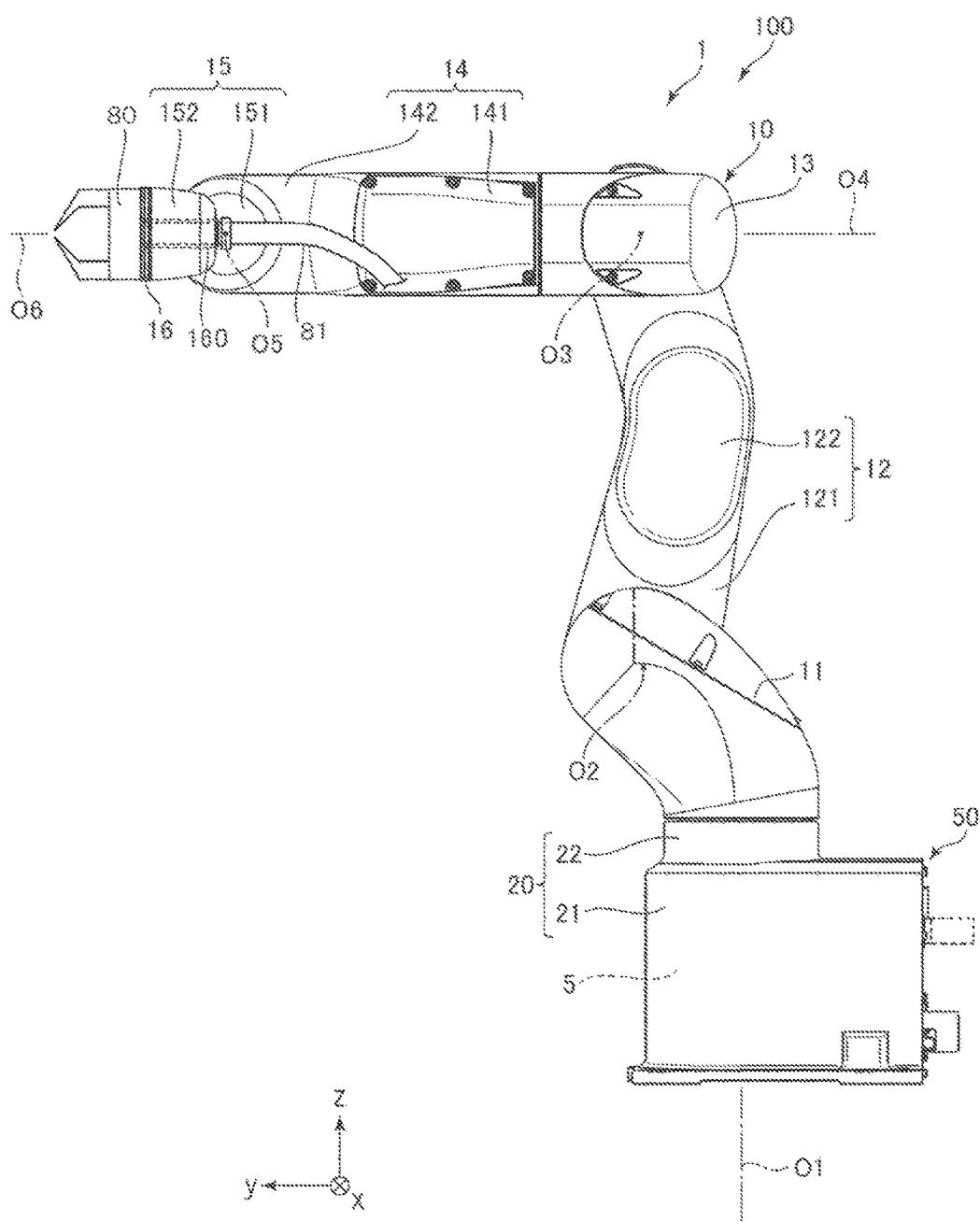
FIG. 4 is a view of the robot illustrated in FIG. 1 as seen from the −x-axis side.
Figure 5:
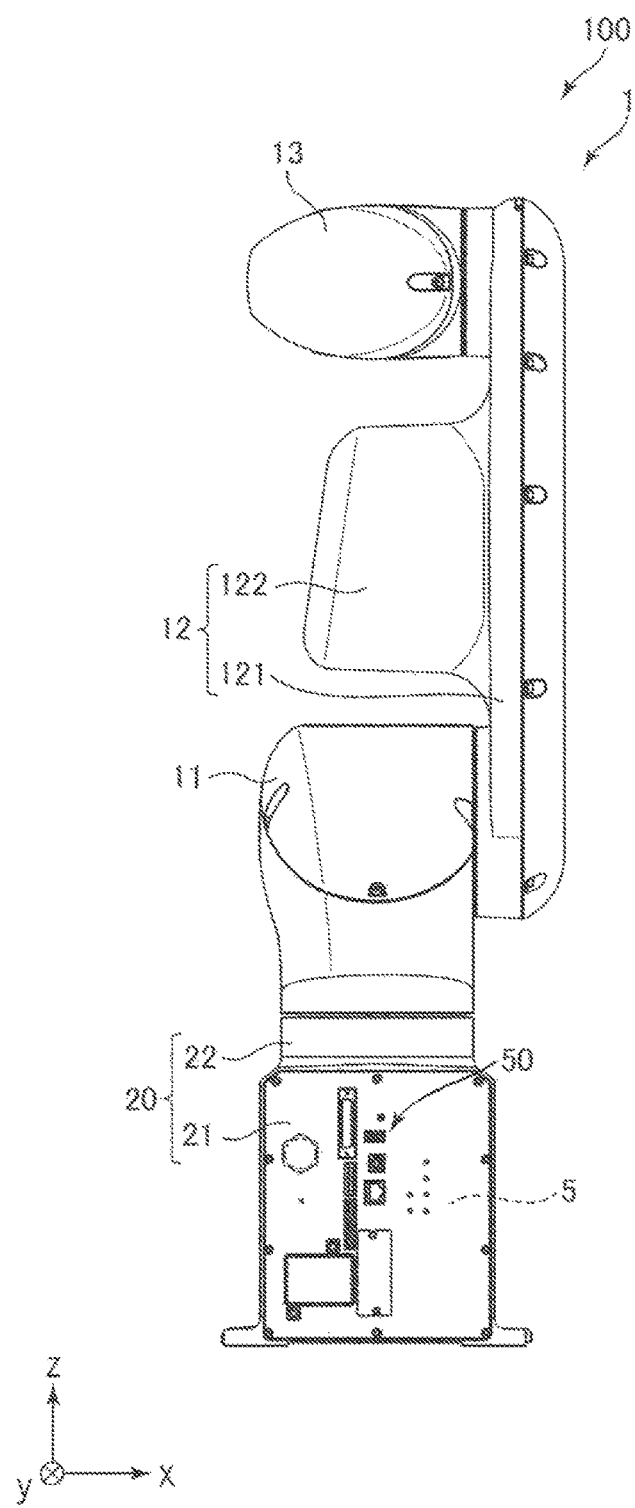
FIG. 5 is a view of the robot illustrated in FIG. 1 as seen from the −y-axis side.
Figure 6:
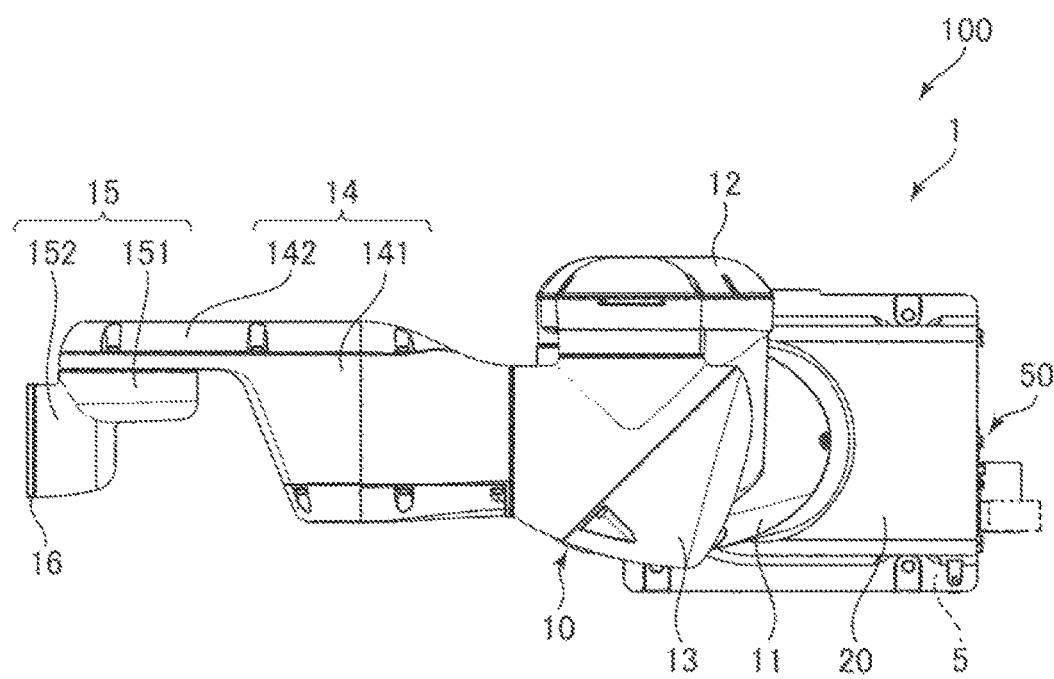
FIG. 6 is a view of the robot illustrated in FIG. 1 as seen from the +z-axis side.
Figure 6:
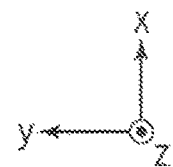
Figure 7:
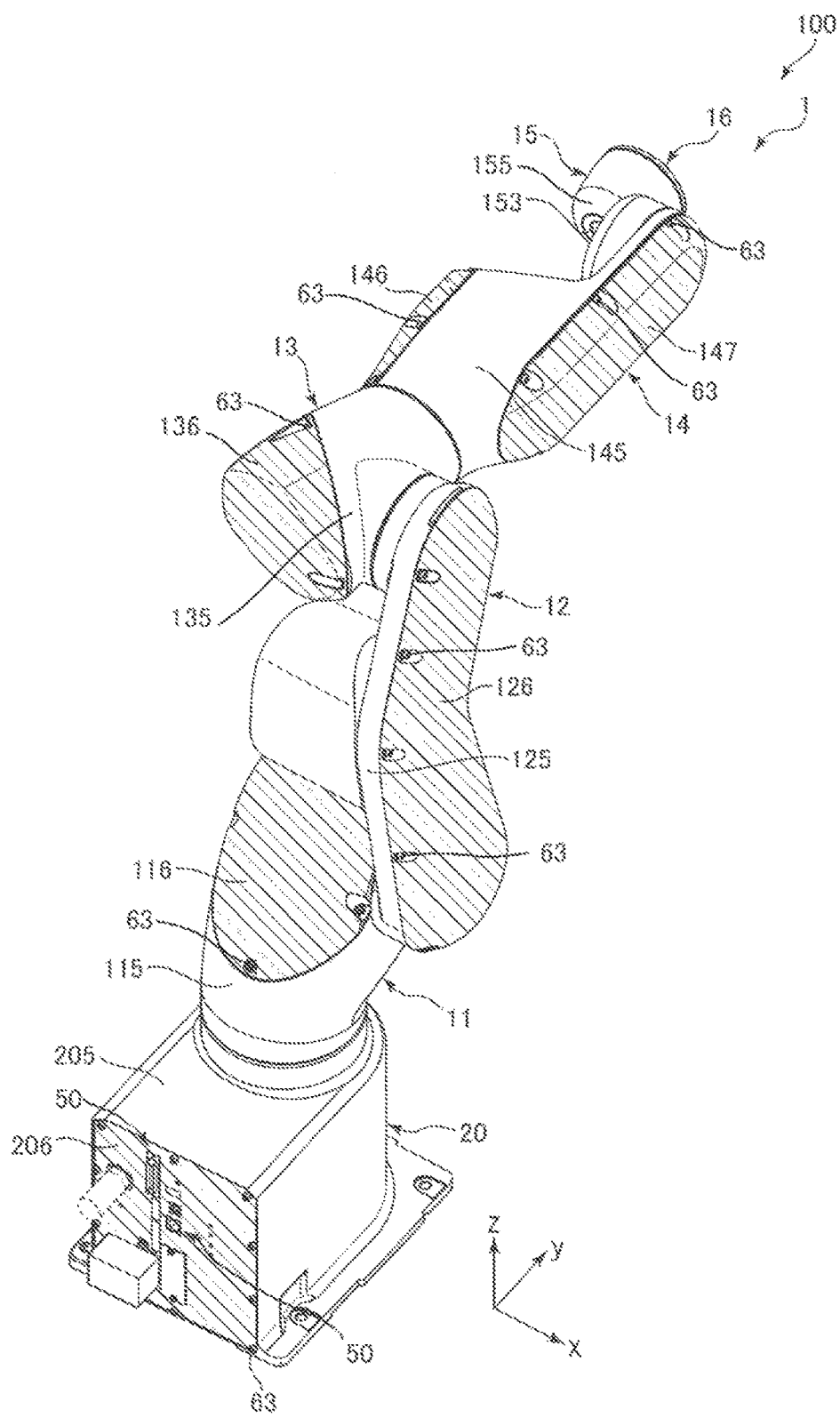
FIG. 7 is a view for explaining a plurality of housings and covers included in the robot.
Figure 8:
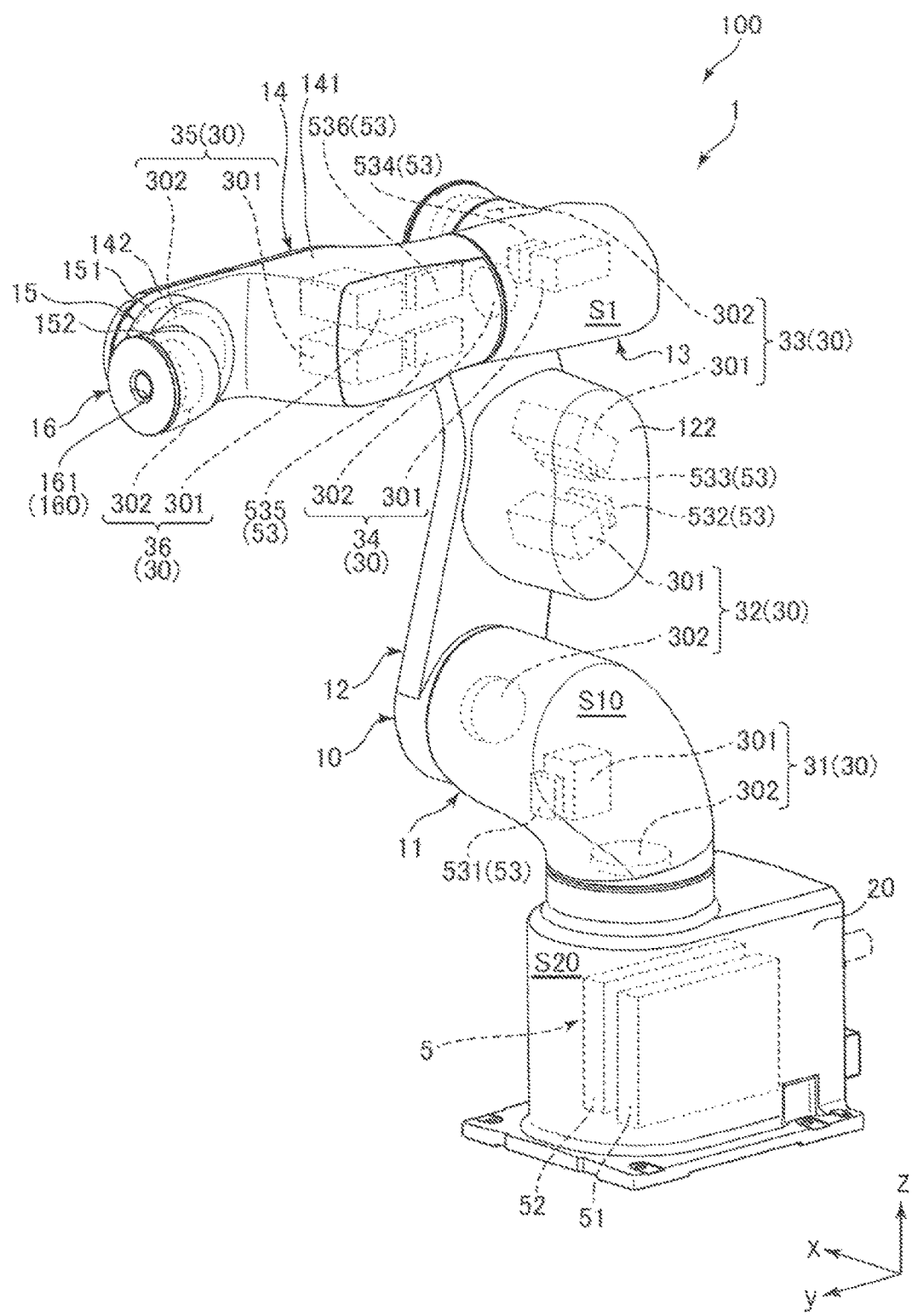
FIG. 8 is a perspective view schematically illustrating the interior of a robot main body included in the robot.

FIG. 1 is a perspective view illustrating a robot according to a first embodiment. FIG. 2 is a perspective view of the robot illustrated in FIG. 1 as seen in a direction different from that in FIG. 1. FIG. 3 is a block diagram of the robot illustrated in FIG. 1. FIG. 4 is a view of the robot illustrated in FIG. 1 as seen from the −x-axis side. FIG. 5 is a view of the robot illustrated in FIG. 1 as seen from the −y-axis side. FIG. 6 is a view of the robot illustrated in FIG. 1 as seen from the +z-axis side. FIG. 7 is a view for explaining a plurality of housings and covers included in the robot. FIG. 8 is a perspective view schematically illustrating the interior of a robot main body included in the robot.

For convenience of description, in each of FIGS. 1, 2, and 4 to 8, x, y, and z axes are illustrated as three axes orthogonal to each other in the following description, and the tip end side of the arrow indicating each axis is defined as "+", and the base end side thereof is defined as "−". Also, a direction parallel to the x-axis is referred to as the "x-axis direction", a direction parallel to the y-axis is referred to as the "y-axis direction", and a direction parallel to the z-axis is referred to as "z-axis direction". The base 20 side of a robot 100 illustrated in FIG. 1 is referred to as a "base end", and the opposite side (sixth arm 16 side) is referred to as a "tip end". The upper side in FIG. 4 is referred to as "upper" and the lower side is referred to as "lower". Further, the up-and-down direction in FIG. 4 is defined as the "vertical direction", and the right-and-left direction is defined as the "horizontal direction".

Also, in this specification, the term "horizontal" includes a case where an inclination is within a range of ±5 degrees or less with respect to the horizontal. Similarly, the term "vertical" includes a case where an inclination is within a range of ±5 degrees or less with respect to the vertical. Also, the term "parallel" includes not only a case where two lines (including axes) or planes are perfectly parallel to each other but also a case where two lines (including axes) or planes are inclined within ±5 degrees. The term "orthogonal" includes not only a case where two lines (including axes) or planes intersect each other at an angle of 90° but also a case where an inclination is within ±5 degrees with respect to 90°.

The robot 100 illustrated in FIGS. 1 and 2 is a so-called six-axis vertical articulated robot. The robot 100 can be used, for example, in a manufacturing process for manufacturing precision instruments such as wristwatches. In the following, a basic configuration of the robot 100 will be described.

The robot 100 includes a robot main body 1 and a plurality of drive units 30, a plurality of position sensors 40, and a control unit 5 (control device) that are built in the robot main body 1 (see FIGS. 1 to 3).

In this specification, the orientation of the robot 100 illustrated in FIG. 1 (the same orientation in FIGS. 2 and 4 to 8) is referred to as "basic orientation". In addition, for convenience of description, unless otherwise mentioned, in the description on a disposition relationship of the respective portions of the robot 100, description will be made based on the robot 100 in a stationary state in the basic orientation.

Robot Main Body

As illustrated in FIGS. 1 and 2, the robot main body 1 includes a base 20 and a robot arm 10 connected to the base 20.

As will be described later in detail, the robot main body 1 is configured to include a plurality of exterior members, and includes an internal space S1 that accommodates the plurality of drive units 30, the plurality of position sensors 40, and the control unit 5. The internal space S1 includes the inside of the base 20, that is, an internal space S20, and the inside of the robot arm 10, that is, the internal space S10, and the internal space S10 and the internal space S20 communicate with each other.

Base

The base 20 is a portion for attaching the robot 100 to any installation place. The installation place of the base 20 is not particularly limited, and may be, for example, a floor, a wall, a ceiling, a work stand, a movable carriage, and the like. The base 20 includes a main body 21 having a rectangular parallelepiped outer shape and a protruding portion 22 provided on the +z-axis side of the main body 21 and having a columnar outer shape.

Robot Arm

The robot arm 10 is rotatably supported on the base 20, and includes a first arm 11, a second arm 12, a third arm 13, a fourth arm 14, a fifth arm 15, and a sixth arm 16 (tip end arm). These arms of the first arm 11, the second arm 12, the third arm 13, the fourth arm 14, the fifth arm 15, and the sixth arm 16 are connected in this order from the base end side to the tip end side, and are configured so as to be rotatable relative to the adjacent base end side arm or the base 20. In the embodiment, the fourth arm 14 constitutes an "A-arm", the fifth arm 15 constitutes a "B-arm", and the sixth arm 16 constitutes a "C-arm".

As illustrated in FIG. 4, the first arm 11 is connected to the protruding portion 22 of the base 20, and is rotatable around the rotational axis O1 along the vertical direction with respect to the base 20. The first arm 11 has a shape extending obliquely upward from the base 20 and the tip end portion of the first arm 11 protrudes outward from the base 20 as seen in the z-axis direction.

As illustrated in FIGS. 4 and 5, the second arm 12 is connected to a portion on the +x-axis side of the tip end portion of the first arm 11, and is rotatably movable with respect to the first arm 11 around a rotation axis O1 along a horizontal direction. The second arm 12 has a longitudinal shape in which the central portion is bent as seen in the x-axis direction, and includes a flat portion 121 having a shape extending from the first arm 11 toward the third arm 13 and a protruding portion 122 protruding from the central portion of the flat portion 121 toward the −x-axis direction. The protruding portion 122 is separated from the first arm 11 so as not to contact the first arm 11 even when the second arm 12 rotates.

As illustrated in FIGS. 4, 5, and 6, the third arm 13 is connected to a surface (portion) on the same −x-axis side as the surface of the flat portion 121 on which the first arm 11 is provided and is rotatable around a rotation axis O3 along the horizontal direction with respect to the second arm 12.

The third arm 13 has a shape protruding from the second arm 12 in the −x-axis direction. In addition, the third arm 13 is connected to the second arm 12 so as not to contact the protruding portion 122.

As illustrated in FIG. 4, the fourth arm 14 is connected to the tip end portion of the third arm 13 and is rotatable around a rotation axis O4 (A-rotation axis) orthogonal to the rotation axis O3 with respect to the third arm 13. As illustrated in FIG. 6, the fourth arm 14 has a shape extending in the +y-axis direction from the third arm 13, and the length (width) of the fourth arm 14 in the x-axis direction gradually decreases in the +x-axis direction (one side in the width direction of the fourth arm 14) while orienting from the base end side to the tip end side in the middle. Such a fourth arm 14 includes a base end side portion 141 and a tip end side portion 142 whose length in the x-axis direction is shorter than that of the base end side portion 141.

As illustrated in FIG. 4, the fifth arm 15 is connected to the −x-axis side portion of the tip end side portion 142, and is rotatable around a rotation axis O5 (B-rotation axis) orthogonal to the rotation axis O4 with respect to the fourth arm 14. As illustrated in FIGS. 4 and 6, the fifth arm 15 includes a first area 151 protruding from the tip end portion of the fourth arm 14 in the −x-axis direction and a second area 152 connected to the first area 151. The second area 152 is connected to the base end portion of the first area 151 at the portion on the +x-axis side of the center line thereof.

The sixth arm 16 is connected to the base end portion of the fifth arm 15, and is rotatable around a rotation axis O6 (C-rotation axis) orthogonal to the rotation axis O5 with respect to the fifth arm 15. Such a sixth arm 16 is configured in such a way that an end effector 80 constituted by a hand or the like capable of gripping a work target (not illustrated) is attached thereto (see FIG. 4). The wiring or pipe for transmitting the driving force to the end effector 80 has flexibility, and a flexible member 81 constituted with the wiring or pipe is routed from the end effector 80 to the robot arm 10. Routing of the flexible member 81 with respect to the robot arm 10 will be described in detail later.

Although not illustrated, the sixth arm 16 may be configured so that a force detection device (not illustrated) for detecting a force (including moment) applied to the end effector 80 can be attached. In that case, it is preferable to provide a force detection device between the end effector 80 and the sixth arm 16 so that the force applied to the end effector 80 can be suitably detected. The end effector 80 is not limited to a hand, and any configuration may be adopted as long as some work can be performed on the work target.

Such a robot main body 1 is configured to include a plurality of exterior members (housing 205 and cover 206), and an internal space S1 is constituted by the plurality of exterior members (see FIG. 7 and FIG. 8).

Specifically, as illustrated in FIG. 7, the base 20 includes a housing 205 and a cover 206 as exterior members, and the cover 206 is fixed to the housing 205 with a screw 63. The first arm 11 includes a housing 115 and a cover 116 as exterior members, the second arm 12 includes a housing 125 and a cover 126 as exterior members, the third arm 13 includes a housing 135 and a cover 136 as exterior members, and the fourth arm 14 includes a housing 145, a cover 146, and a cover 147 as exterior members. The covers 116, 126, 136, 146, and 147 are fixed to the corresponding housings 115, 125, 135, and 145 with screws 63. The fifth arm 15 includes a case 155 as an exterior member.

Furthermore, a sealing member made of packing or the like between the respective exterior members is provided to thereby make it possible to airtightly seal the interior (internal space S1) of the robot main body 1. For example, a sealing member is provided between the housing 115 and the cover 116 and between the housing 115 and the housing 125. With this configuration, the robot main body 1 can exhibit excellent waterproof performance and dustproof performance. For that reason, it is possible to suitably use the robot 100 even in an environment in which dust, water, cutting oil or the like falls.

The basic configuration of the robot main body 1 has been briefly described as above. As described above, the robot 100 including the robot main body 1 having such a configuration is a vertical articulated robot including six (plural) arms of the first arm 11, the second arm 12, the third arm 13, the fourth arm 14, the fifth arm 15 and the sixth arm 16. That is, the robot 100 has six rotation axes O1 to O6, and is a robot with six degrees of freedom. For that reason, the driving range of the tip end portion of the robot arm 10 is wide, so that high workability can be exhibited. In the embodiment, the number of arms included in the robot 100 is six, but the number of arms may be three to five, or may be seven or more. However, in order to precisely position the end effector 80 provided at the tip end of the robot arm 10 at the intended place in the three-dimensional space, it is preferable that the number of arms (number of rotation axes) is at least six.

As described above, the fifth arm 15 is connected to a portion on the −x-axis side of the portion 142 of the fourth arm 14. As such, the fifth arm 15 is not configured to be supported at both ends as sandwiched by the fourth arm 14, but is cantilevered off the fourth arm 14. With this configuration, as compared with a case where the fifth arm 15 is supported at both ends by the fourth arm 14, the configuration of the fourth arm 14 and the fifth arm 15 can be simplified and the cost can be reduced. Furthermore, as described above, the second arm 12 is connected to a portion on the +x-axis side of the tip end side portion of the first arm 11. As such, the second arm 12 is not configured to be supported at both ends by the first arm 11, but is cantilevered off the first arm 11. With this configuration, as compared with the case where the second arm 12 is supported at both ends by the first arm 11, the configuration of the first arm 11 and second arm 12 can be simplified and the cost can be reduced. As described above, in the embodiment, there are a plurality (two) of cantilevered arms. For that reason, the configuration of the robot arm 10 can be simplified, and the cost can be greatly reduced.

In the embodiment, the volume of the inside of the base 20 is equal to or smaller than the volume of the robot arm 10. For that reason, the degree of freedom of installation of the base 20 can be increased.

Drive Unit

As illustrated in FIG. 3, the robot 100 includes the same number (six in the embodiment) of drive units 30 as the arms of first arm 11, second arm 12, third arm 13, fourth arm 14, fifth arm 15, and sixth arm 16. Each of the plurality of drive units 30 has a function of rotating the corresponding arm with respect to the arm (or base 20) positioned on the base end side thereof, and includes a motor unit 301 including a motor as a power source and a brake, a power transmission mechanism (not illustrated) including a reduction gear 302, a belt (not illustrated), a pulley (not illustrated), and the like. As the motor, for example, a servo motor such as an AC servo motor, a DC servo motor or the like can be used. As the reduction gear 302, for example, a wave gear device or the like can be used.

In the embodiment, one drive unit 30 is responsible for driving one arm. Accordingly, the robot 100 includes a first drive unit 31 for driving the first arm 11, a second drive unit 32 for driving the second arm 12, a third drive unit 33 for driving the third arm 13, a fourth drive unit 34 for driving the fourth arm 14, a fifth drive unit 35 for driving the fifth arm 15, and a sixth drive unit 36 for driving the sixth arm 16. In the following description, when the first drive unit 31, the second drive unit 32, the third drive unit 33, the fourth drive unit 34, the fifth drive unit 35, and the sixth drive unit 36 are not distinguished from each other, these drive units are respectively referred to as the drive unit 30.

As illustrated in FIG. 8, each of the motor unit 301 and the reduction gear 302 included in the first drive unit 31 is provided inside the first arm 11. Although not illustrated in detail, the first drive unit 31 includes the motor unit 301, the reduction gear 302, a first pulley (not illustrated) connected to the shaft portion of the motor unit 301, a second pulley (not illustrated) disposed to be spaced apart from the first pulley and connected to the shaft portion of the reduction gear 302, and a belt (not illustrated) wound around the first pulley and the second pulley. Matters substantially the same as those described above are applied to the second drive unit 32, the third drive unit 33, the fourth drive unit 34, the fifth drive unit 35, and the sixth drive unit 36, which will be described later, and the corresponding arm is driven through so-called belt drive.

As illustrated in FIG. 8, the motor unit 301 included in the second drive unit 32 is provided in the protruding portion 122, and the reduction gear 302 included in the second drive unit 32 is provided at a connection portion (joint portion) between the second arm 12 and the first arm 11. The motor unit 301 included in the third drive unit 33 is provided in the protruding portion 122, and the reduction gear 302 included in the third drive unit 33 is provided at a connection portion (joint portion) between the second arm 12 and the third arm 13. Each of the motor unit 301 and the reduction gear 302 included in the fourth drive unit 34 is provided in the third arm 13. The motor unit 301 included in the fifth drive unit 35 is provided in the portion 141 on the base end side of the fourth arm 14 and the reduction gear 302 included in the fifth drive unit 35 is provided in the first area 151 of the fifth arm 15. The motor unit 301 included in the sixth drive unit 36 is provided in the portion 141 on the base end side of the fourth arm 14 and the reduction gear 302 included in the sixth drive unit 36 is provided in the second area 152 of the fifth arm 15 (see FIG. 8).

Position Sensor

As illustrated in FIG. 3, the robot 100 includes the same number of position sensors 40 as that of the drive units 30, and one position sensor 40 (angle sensor) is provided for one drive unit 30. The position sensor 40 detects a rotation angle of the rotation shaft (shaft portion) of the motor unit 301 (specifically, the motor) or the reduction gear 302. With this configuration, it is possible to obtain information such as an angle (orientation) of the arm on the tip end side with respect to the arm on the base end side. As each of these position sensors 40, for example, a rotary encoder or the like can be used. Each position sensor 40 is electrically connected to a control board 51 of the control unit 5 to be described later.

Control Unit

As illustrated in FIG. 3, the control unit 5 includes the control board 51, a power supply board 52 for supplying electric power to the control board 51, a plurality of drive boards 53 for driving the respective drive units 30 based on a command from the control board 51. The control board 51 and the power supply board 52 constitute a control device (controller) that supplies electric power for driving the robot 100 and controls driving of the robot 100.

Control Board

As illustrated in FIG. 8, the control board 51 is provided in the internal space S20 and includes a control circuit (not illustrated) for controlling driving of each portion of the robot 100. The control circuit includes a processor such as a central processing unit (CPU), a volatile memory such as a random access memory (RAM), a nonvolatile memory such as a read only memory (ROM), and the like, and performs control of driving of each portion of the robot 100 and processing such as various arithmetic operations and determinations. For example, the control circuit is capable of executing a predetermined control program, and outputs a control signal to each drive board 53 according to the control program so as to cause the robot 100 (specifically, the robot arm 10) to execute a predetermined operation.

Power Supply Board

As illustrated in FIG. 8, the power supply board 52 is provided in the internal space S20, and includes a power supply circuit (not illustrated) for generating electric power to be supplied to the control board 51 and each drive board 53. The power supply circuit includes a transformer and a noise filter, converts the frequency and voltage of electric power supplied from an external power supply (not illustrated) such as a commercial power supply, and supplies the electric power to the control board 51 and each drive board 53. In particular, in the embodiment, the power supply circuit is provided with a converter for converting an AC voltage output from the external power supply into a DC voltage (drive voltage) of 52 V and outputting the DC voltage (drive voltage) to each drive board 53 or the like.

The control board 51 and the power supply board 52 described above are supported by a support member (not illustrated) made of, for example, a metal plate or the like, and the support member is detachable from the base 20. For that reason, the control board 51 and the power supply board 52 can be taken out together with the support member to the outside of the base 20. With this configuration, for example, maintenance of the control board 51 and the power supply board 52 can be easily performed.

Drive Board

As illustrated in FIG. 8, each of the drive boards 53 is distributed and disposed in the internal space S10, and includes a drive circuit (not illustrated) that receives a control signal from the control board 51 and converts (generates) power into electric power to be supplied to the drive unit 30. The drive circuit includes, for example, an inverter circuit that converts DC power (current) to AC power (current).

In the embodiment, one drive board 53 is provided for one drive unit 30, and the drive board 53 corresponding to each drive unit 30 performs conversion (generation) of electric power to be supplied to the drive unit 30. Accordingly, the robot 100 includes a first drive board 531 corresponding to the first drive unit 31, a second drive board 532 corresponding to the second drive unit 32, a third drive board 533 corresponding to the third drive unit 33, a fourth drive board 534 corresponding to the fourth drive unit 34, a fifth drive board 535 corresponding to the fifth drive unit 35, and a sixth drive board 536 corresponding to the sixth drive unit 36. In the following description, in a case where the first drive board 531, the second drive board 532, the third drive board 533, the fourth drive board 534, the fifth drive board 535, and the sixth drive board 536 are not distinguished from each other, these boards are respectively referred to as the drive board 53.

As illustrated in FIG. 8, the first drive board 531 is provided in the first arm 11, and is provided in the vicinity of the motor unit 301 included in the first drive unit 31. The second drive board 532 is provided in the protruding portion 122 of the second arm 12 and is provided in the vicinity of the motor unit 301 included in the second drive unit 32. The third drive board 533 is provided in the protruding portion 122 of the second arm 12 and is provided in the vicinity of the motor unit 301 included in the third drive unit 33. The fourth drive board 534 is provided in the third arm 13 and is provided in the vicinity of the motor unit 301 included in the fourth drive unit 34. The fifth drive board 535 is provided in the fourth arm 14 and is provided in the vicinity of the motor unit 301 included in the fifth drive unit 35. The sixth drive board 536 is provided inside the fourth arm 14 and is provided in the vicinity of the motor unit 301 included in the sixth drive unit 36.

In the base 20, a plurality of external connection portions 50 constituted by, for example, connectors (see FIG. 7 and the like) are provided. The external connection portion 50 is electrically connected to the control board 51 and the power supply board 52. For example, one external connection portion 50 is a power supply connector for connecting the control board 51 and the power supply board with an external power supply plug (non-connection portion) electrically connected to an external power supply, and electric power is supplied to the robot 100 by connecting an external power plug to the external connection portion 50. With this configuration, the robot 100 can be driven.

As a specific example of such an external connection portion 50, in addition to the power supply connector described above, a connector for inputting and outputting signals to and from various devices such as a teaching pendant used by a worker to give an operation instruction to the robot 100, a connector for outputting a signal to the end effector 80, and a connector for inputting and outputting data relating to a control program, and the like are included.

The basic configuration of the robot 100 has been described as above. As described above, the control unit 5 having the function of the controller is accommodated inside the internal space S1. That is, the robot 100 includes the control board 51 and a power supply board 52 for supplying power to the control board 51, which are provided in the robot main body 1.

With this configuration, since the control unit 5 having the controller function and the robot main body 1 are integrated, there is no need to consider disposition of the controller and the robot main body 1 as in the related art, and the degree of freedom of disposition of the robot 100 can be increased. Further, as compared with the case where the controller is a separate body, it is possible to reduce the total installation area and to save time and effort in connecting the controller.

As described above, the control board 51 and the power supply board 52 are provided in the base 20 of the robot main body 1. With this configuration, it is easy to design the disposition of various wirings (not illustrated) for connecting the control board 51 and the power supply board 52 and each drive board 53. As compared with the case where the control board 51 and the power supply board 52 are provided in the robot arm 10, the control board 51 and the power supply board 52 can be stably disposed, and it is also possible to prevent an increase in load capacity of the tip end portion of the robot arm 10.

As described above, the robot arm 10 includes the first arm 11 rotatably connected to the base 20, and the first drive unit 31 for driving the first arm 11 is provided in the first arm 11. With this configuration, the first drive unit 31 can be kept away from the control board 51 and the like provided in the base 20, as compared with the configuration in which the first drive unit 31 is disposed in the base 20. For that reason, it is possible to reduce thermal runaway caused by heat generated from the first drive unit 31 and heat generated from the control board 51 and the like, so that the robot 100 can be stably driven for a long time. Furthermore, as described above, the robot arm 10 includes the second arm 12 rotatably connected to the first arm 11, and the second drive unit 32 for driving the second arm 12 is provided in the second arm 12. With this configuration, heat generated from the first drive unit and the second drive unit 32 can be eliminated more efficiently.

Further, as described above, the robot arm 10 includes the first arm 11, the second arm 12, the third arm 13, the fourth arm 14, the fifth arm 15, and the sixth arm 16, and a plurality of drive units 30 for independently driving the first arm 11, the second arm 12, the third arm 13, the fourth arm 14, the fifth arm 15, and the sixth arm 16 (plurality of arms) are provided inside the robot arm 10. Then, the plurality of drive units 30 are dispersedly provided in the robot arm 10 (see FIG. 8). With this configuration, since it is possible to disperse heat generated from the drive unit 30, thermal runaway can be reduced, and thus the robot 100 can be stably driven for a long time. The disposition of the plurality of drive units is not limited to the illustrated disposition. The "dispersion" described above includes not only a case where all of the plurality of drive units 30 are disposed separately but also a case where the plurality of drive units 30 are disposed by being divided into at least two groups.

In addition, as described above, the first drive board 531 for driving the first drive unit 31 is provided in the first arm 11 and the second drive board 532 for driving the second drive unit 32 is provided in the second arm 12. With this configuration, connection between the first drive board 531 and the first drive unit 31 and connection between the second drive board 532 and the second drive unit 32 can be made in a simple configuration. Since heat generated from the first drive board 531 and the second drive board 532 can be dispersed, the robot 100 can be stably driven for a long time.

Furthermore, as described above, the plurality of drive boards 53 for independently driving the plurality of drive units 30, respectively, are provided in the robot arm 10. Then, the plurality of drive boards 53 are dispersedly provided in the robot arm 10. With this configuration, it is possible to simplify connection between the drive board and the corresponding drive unit 30, for example, as compared with a configuration in which the plurality of drive units 30 are driven by one drive board 53. Since the plurality of drive boards 53 are dispersedly provided, heat generated from the drive board 53 can be dispersed and thus, the robot 100 can be stably driven for a long time. The disposition of the plurality of drive boards 53 is not limited to the illustrated disposition. The "dispersion" described above includes not only a case where all of the plurality of drive boards 53 are disposed separately but also a case where the plurality of drive boards 53 are disposed by being divided into at least two groups.

As illustrated in the drawing, it is particularly preferable that each drive board 53 is provided in the vicinity of the corresponding drive unit 30. With this configuration, it is possible to remarkably reduce the number of wirings of a power supply system and the number of wirings of a signal system, as compared with the case where the plurality of drive boards 53 are disposed collectively in the base 20.

Here, in the embodiment, in order that the flexible member 81 connected to the end effector 80 can be easily routed to the robot arm 10, the configuration of the fourth arm 14, the fifth arm 15, and the sixth arm 16 is devised. In the following, description will be made on this matter.

Fourth Arm, Fifth Arm, Sixth Arm, and End Effector

Figure 9:
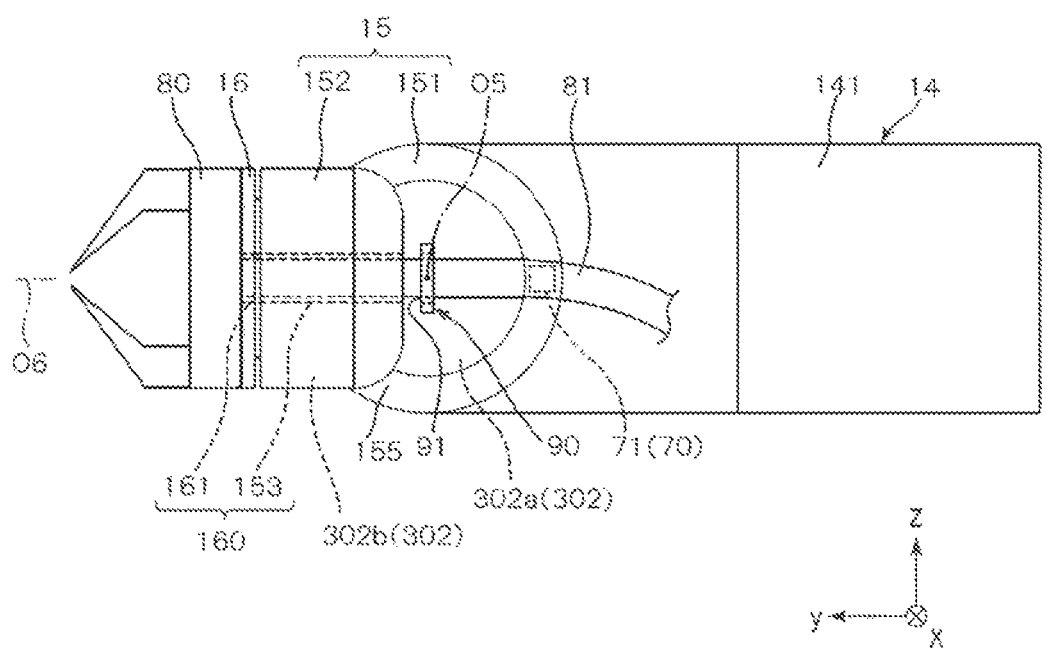
FIG. 9 is a view schematically illustrating a tip end portion of a robot arm.
Figure 10:
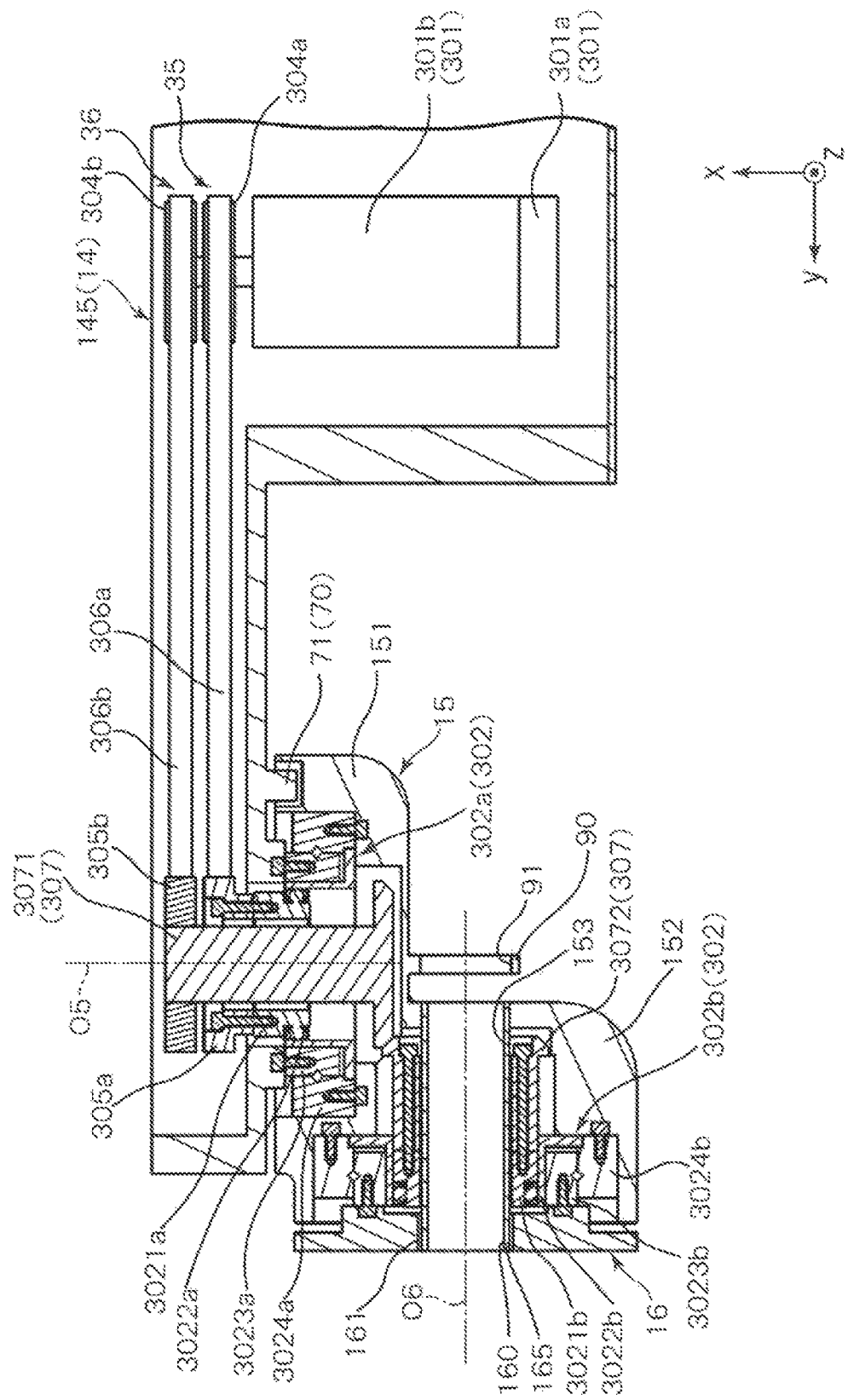
FIG. 10 is a cross-sectional view schematically illustrating a fifth drive unit and a sixth drive unit.
Figure 11:
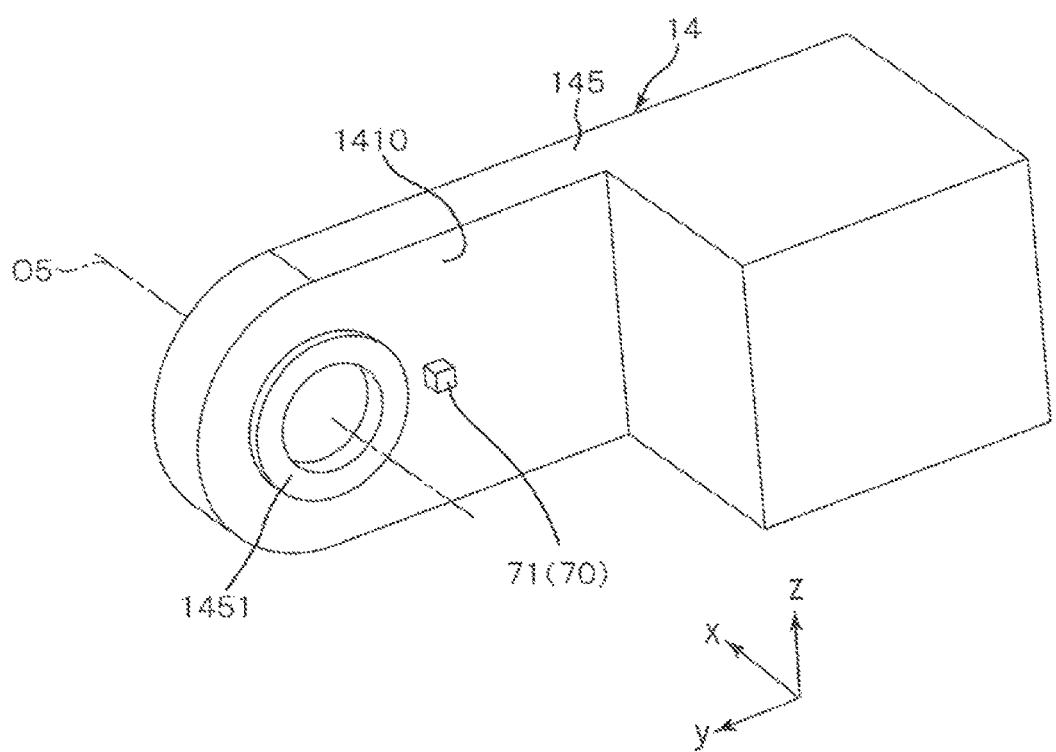
FIG. 11 is a view illustrating a first engagement portion provided on a fourth arm.
Figure 12:
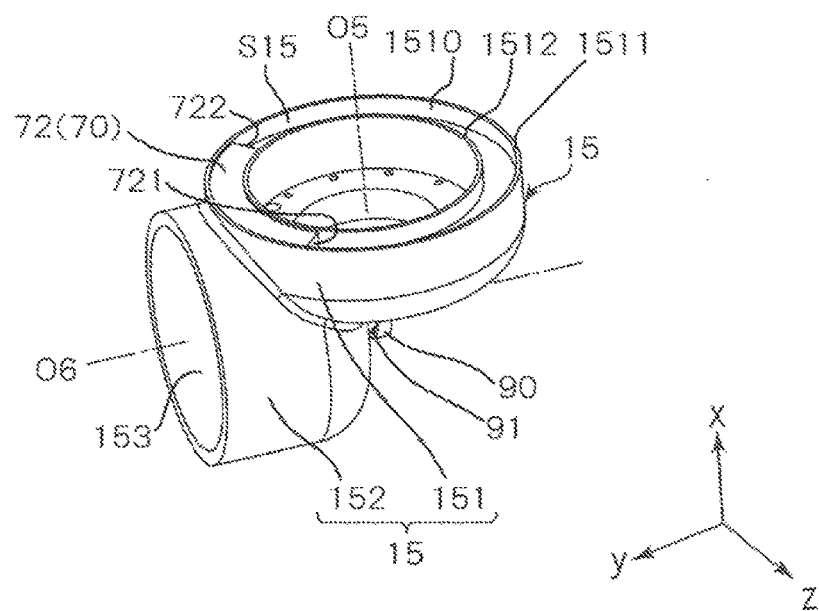
FIG. 12 is a view illustrating a second engagement portion provided on a fifth arm.
Figure 13:
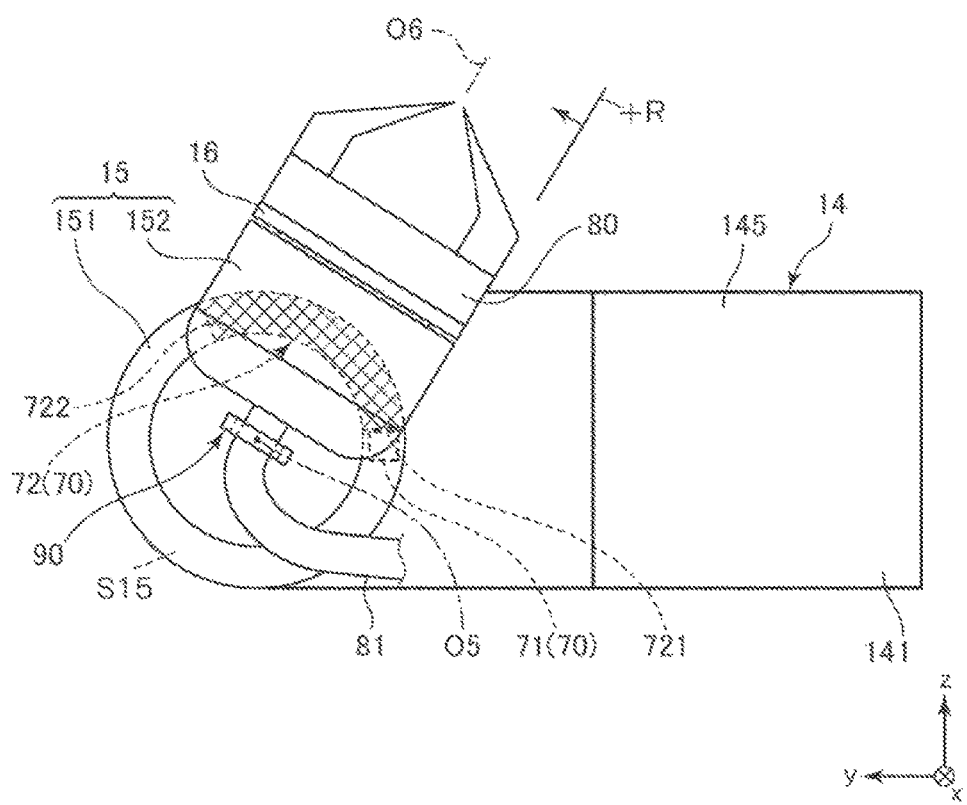
FIG. 13 is a view for illustrating regulating rotation of the fifth arm.
Figure 14:
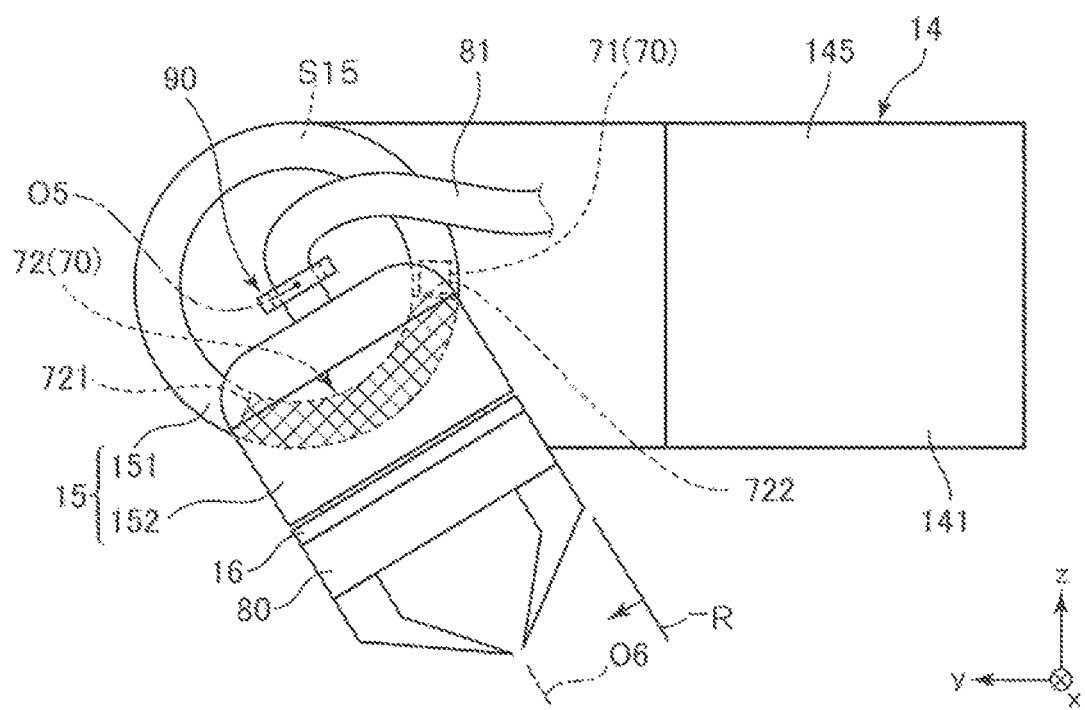
FIG. 14 is another diagram for illustrating regulating rotation of the fifth arm.

FIG. 9 is a view schematically illustrating the tip end portion of the robot arm. FIG. 10 is a cross-sectional view schematically illustrating the fifth drive unit and the sixth drive unit, in which a connection structure of the fourth arm (A-arm), the fifth arm (B-arm) and the sixth arm (C-arm) is illustrated. FIG. 11 is a view illustrating the first engagement portion provided on the fourth arm. FIG. 12 is a view illustrating a second engagement portion provided on the fifth arm. FIG. 13 and FIG. 14 are diagrams for illustrating regulating rotation of the fifth arm, respectively.

As illustrated in FIG. 9, the sixth arm 16 (C-arm) has a disk shape and is configured so that the end effector 80 can be attached thereto. A through-hole 161 penetrating the sixth arm along the y-axis direction is formed in the central portion of the sixth arm 16. The through-hole 161 is along the rotation axis O6. In particular, in this embodiment, the central axis of the through-hole 161 coincides with the rotation axis O6.

The fifth arm 15 (B-arm) includes a first area 151 having a columnar outer shape and a second area 152 having a cylindrical shape (see FIGS. 10 and 12). The second area 152 includes a hole 153 penetrating along the y-axis direction (see FIG. 9).

The first area 151 is connected to the fourth arm 14 and the second area 152 is connected to the sixth arm 16. In the embodiment, the first area 151 and the second area 152 are integrally formed so that the center axes thereof are orthogonal to each other, but the first area 151 and the second area 152 may be formed by connecting a separate member thereto. The second area 152 is configured such that both end portions (both openings) of the hole 153 are not blocked by the first area 151.

The hole 153 formed in the second area 152 is along the rotation axis O6. In particular, in the embodiment, the center axis of the hole 153 coincides with the rotation axis O6. The hole 153 communicates with the through-hole 161 described above, and the hole 153 and the through-hole 161 constitute a through-hole 160. The through-hole 160 functions as a hole for a flexible member through which the flexible member 81 constituted by a wiring or a pipe for transmitting a driving force to the end effector 80 is inserted.

As described above, the reduction gear 302a (reduction gear 302) included in the fifth drive unit 35 is disposed in the first area 151, and the reduction gear 302b (reduction gear 302) included in the sixth drive unit 36 is disposed in the second area 152 (see FIG. 10). The fifth drive unit 35 includes a motor unit 301a (motor unit 301), a reduction gear 302a, a first pulley 304a connected to the shaft portion of the motor unit 301a, a second pulley 305a disposed to be spaced apart from the first pulley 304a and connected to the shaft portion of the reduction gear 302a, and a belt 306a wound around the first pulley 304a and the second pulley 305a. Similarly to the fifth drive unit 35, the sixth drive unit 36 includes a motor unit 301b (motor unit 301), a reduction gear 302b, a first pulley 304b, a second pulley 305b, and a belt 306b. Furthermore, the sixth drive unit 36 is constituted with two bevel gears 3071 and 3072 that are engaged with each other, and includes a conversion mechanism 307 that converts the transmission direction of the driving force by 90°.

The reduction gear 302a is configured to include a wave gear device, and includes a wave generator 3021a, a flex spline 3022a (external gear) disposed outside the wave generator 3021a, and a circular spline 3023a (internal gear) disposed outside the flex spline 3022a. In the embodiment, an inner ring of a cross-roller bearing and the circular spline 3023a are formed integrally, and an outer ring 3024a of the cross-roller bearing is positioned outside the circular spline 3023a. The wave generator 3021a is connected to the second pulley 305a and functions as an input shaft. The flex spline 3022a is connected to the outer ring 3024a of the cross-roller bearing and functions as an output shaft. The circular spline 3023a is connected to the housing 145 of the fourth arm 14 and functions as a fixed shaft.

Similar to the reduction gear 302a, the reduction gear 302b is configured to include a wave gear device, and includes a wave generator 3021b, a flex spline 3022b (external gear), and a circular spline 3023b (internal gear). The inner ring of a cross-roller bearing and the circular spline 3023b are formed integrally, and an outer ring 3024b of the cross-roller bearing is positioned outside the circular spline 3023b. The wave generator 3021b is connected to the conversion mechanism 307 connected to the second pulley 305b, and functions as an input shaft. The flex spline 3022b is connected to the outer ring 3024b of the cross-roller bearing and functions as a fixed shaft. The circular spline 3023b is connected to the sixth arm 16 and functions as an output shaft. As such, since the reduction gear 302b is configured to include the wave gear device, the interior of the fifth arm 15 can be configured to have a hollow structure in a state where the reduction gear 302b is disposed in the second area 152. Accordingly, the fifth arm 15 including the hole 153 described above can be easily realized. In the embodiment, a cylindrical member 165 fixed to the fifth arm 15 is inserted through the hole 153 and the through-hole 161, and the through-hole 160 is formed by the cylindrical member 165.

A clamp 90 for fixing the flexible member 81 to the first area 151 is provided on the −x-axis side of the outer surface of the first area 151 (see FIGS. 9 and 10). A clamp hole 91 (hole through which the flexible member 81 is inserted) included in the clamp 90 is along the rotation axis O6. In particular, in this embodiment, the center axis of the clamp hole 91 coincides with the rotation axis O6.

The clamp hole 91 and the through-hole 160 described above are disposed on a straight line, that is, on the rotation axis O6. For that reason, the flexible member 81 can be easily pulled out from the end effector 80 to the outside of the fifth arm 15 without unintentionally bending the flexible member 81.

Although a specific configuration of the clamp 90 is not particularly limited as long as the clamp 90 can restrict a position of the flexible member 81 with respect to the fifth arm 15, for example, a ring-shaped member made of a metal material or a resin material may be included.

As illustrated in FIG. 10, a restriction 70 functioning as a mechanical stopper for regulating the rotation of the fifth arm 15 with respect to the fourth arm 14 is provided at the connection portion between the first area 151 and the fourth arm 14.

The restriction 70 is configured to include a first engagement portion 71 provided on the outer surface 1410, of the fourth arm 14, facing the fifth arm 15 (first area 151) and a second engagement portion 72 provided inside the first area 151 included in the fifth arm 15 (see FIGS. 11 and 12). As the fifth arm 15 rotates with respect to the fourth arm 14 in a state where the fourth arm 14 and the fifth arm 15 are connected to each other, the first engagement portion 71 and the second engagement portion 72 engage each other (see FIG. 13 and FIG. 14). With this configuration, it is possible to restrict rotating (particularly, rotating angle range) of the fifth arm 15. In FIGS. 13 and 14, the second engagement portion 72 is hatched to facilitate understanding.

As illustrated in FIG. 11, the first engagement portion 71 is constituted by a projection which is formed on a portion (portion facing the first area 151) on the −x-axis side of the outer surface 1410 and protrudes from the outer surface 1410 in the −x-axis direction. The first engagement portion 71 is provided on the +x-axis side of a connection portion 1451 in the vicinity of the connection portion 1451 of the fourth arm 14 with respect to the fifth arm 15 and is provided at a position where the first engagement portion 71 can be engaged with the second engagement portion 72 in a state where the fourth arm 14 and the fifth arm 15 are connected to each other.

On the other hand, as illustrated in FIG. 12, the second engagement portion 72 is constituted by a projection which protrudes from an inner surface 1510 of an outer wall portion 1511 toward the inner side of the first area 151. Specifically, the second engagement portion 72 is constituted by a rib so as to fill a part of an annular space S15 between the outer wall portion 1511 of the first area 151 and an inner wall portion 1512 provided to be spaced apart from the outer wall portion 1511 of the first area 151. In the embodiment, the second engagement portion 72 is disposed in a portion on a side (+y-axis side) of the second area 152 of the space S15. The second engagement portion 72 constituted by the rib has a function of reinforcing mechanical strength between the outer wall portion 1511 and the inner wall portion 1512. However, the second engagement portion 72 is not limited to the rib, and may be, for example, at least one protrusion.

The restriction 70 configured to include the first engagement portion 71 and the second engagement portion 72 is not exposed to the outside of the fourth arm 14 and the fifth arm 15 in a state where the fourth arm 14 and the fifth arm 15 are connected to each other. That is, the restriction 70 is disposed on the inner side of the fourth arm 14 and the fifth arm 15. In the embodiment, the first engagement portion 71 is inserted (accommodated) into the space S15 in a state where the fourth arm 14 and the fifth arm 15 are connected to each other, and accordingly, the restriction 70 is covered with the outer wall portion 1511 of the fifth arm 15 and the outer surface 1410 of the fourth arm 14, and is not exposed to the outside.

Hereinafter, restriction of rotation of the fifth arm 15 by the restriction 70 will be briefly described. The fifth arm 15 (in the basic orientation) in the state illustrated in FIG. 9 rotates clockwise in FIG. 9 around the rotation axis O5, and is brought into the state illustrated in FIG. 13, and when the tip end portion of the end effector 80 approaches the portion 141 on the base end side of the fourth arm 14, along With this configuration, the first engagement portion 71 relatively moves in the space S15 and contacts one end surface 721 of the second engagement portion 72 constituted by the rib. With this configuration, the first engagement portion 71 and the second engagement portion 72 are engaged with each other, and the clockwise rotation in FIG. 13 around the rotation axis O5 of the fifth arm 15 is restricted. That is, the state illustrated in FIG. 13 becomes the clockwise rotating limit +R of the fifth arm 15. With this configuration, it is possible to prevent the tip end portion of the end effector 80 from colliding with the portion 141 of the base end side of the fourth arm 14.

The fifth arm 15 in the state illustrated in FIG. 9 rotates counterclockwise in FIG. 9 around the rotation axis O5, and is brought into the state illustrated in FIG. 14, and when the tip end portion of the end effector 80 approaches the portion 141 on the base end side of the fourth arm 14, along With this configuration, the first engagement portion 71 relatively moves in the space S15 and contacts one end surface 722 of the second engagement portion 72 constituted by the rib. With this configuration, the first engagement portion 71 and the second engagement portion 72 are engaged with each other, and the counterclockwise rotation in FIG. 14 around the rotation axis O5 of the fifth arm 15 is restricted. That is, the state illustrated in FIG. 14 becomes the counterclockwise rotating limit −R of the fifth arm 15. With this configuration, it is possible to prevent the tip end portion of the end effector 80 from colliding with the portion 141 on the base end side of the fourth arm 14.

A rotating angle range (rotating limits +R and −R) of the fifth arm 15 can be appropriately changed and adjusted. A forming angle range of the second engagement portion 72 (rib) in the annular space S15 is not particularly limited, but can be set to, for example, a degree equal to or greater than 15° and less than 180°. In the illustrated configuration, the forming angle range of the second engagement portion 72 (rib) is approximately 80° to 90°. Accordingly, the rotating angle range of the fifth arm 15 with respect to the fourth arm 14 is not particularly limited, but can be set to, for example, a degree equal to or greater than 180° and equal to or less than 345°. In the illustrated configuration, the rotation angle range is approximately 240° to 270°.

Such restriction of the rotating (rotating angle range) of the fifth arm 15 by the restriction 70 is particularly effective in a case where a malfunction or the like occurs in control of the rotating of the fifth arm 15 by the control unit 5. As described above, since the clamp 90 is provided, it is possible to reduce deflection of the flexible member 81 even if the fifth arm 15 rotates.

Here, as described above, the robot 100 includes the robot main body 1 including the robot arm 10 that includes the fourth arm 14 (A-arm) which is rotatable around the rotation axis O4 (A-rotation axis), the fifth arm 15 (B-arm) which is cantilevered off the fourth arm 14 (A-arm) and is rotatable around the rotation axis O5 (B-rotation axis), and the sixth arm 16 (C-arm) which is connected to the fifth arm 15 (B-arm), to which the end effector 80 can be attached, and which is rotatable around the rotation axis (C-rotation axis) (see FIGS. 4 and 9). The fourth arm (A-arm) includes the first engagement portion 71. The fifth arm 15 (B-arm) includes the clamp 90 that restricts the position of the flexible member 81 including at least one of the wiring and pipe connected to the end effector 80 and the second engagement portion 72 engageable with the first engagement portion 71. The sixth arm 16 (C-arm) includes the through-hole 161 through which the flexible member 81 can be inserted and which penetrates the sixth arm 16 along the axial direction of the rotation axis O6 (C-rotation axis). The robot arm 10 includes the restriction 70 which is configured to include the first engagement portion 71 and the second engagement portion 72 and restricts rotating of the fifth arm 15 (B-arm) with respect to the fourth arm 14 (A-arm) by engagement of the first engagement portion 71 with the second engagement portion 72. Then, the restriction 70 is not exposed to the outside of the robot arm 10 in a state where the fourth arm (A-arm) and the fifth arm 15 (B-arm) are connected to each other.

According to such a robot 100, since the sixth arm 16 includes the through-hole 161 through which the flexible member 81 can be inserted and the fifth arm 15 includes the clamp 90 for regulating the position of the flexible member 81, it is possible to prevent deflection of the flexible member 81 and interference of the flexible member 81 with the peripheral device due to the operation of the robot arm (in particular, sixth arm 16 connected to the end effector 80 and fifth arm 15 connected to the sixth arm 16). Since the fifth arm 15 is cantilevered with respect to the fourth arm 14, the flexible member 81 can be easily routed and damage to the flexible member 81 can be reduced. Furthermore, since the restriction 70 which exhibits the function as a so-called mechanical stopper is provided inside the robot arm 10 so as not to be exposed to the outside of the robot arm 10, damage of the flexible member 81 by the restriction 70 can also be reduced. For that reason, troubles of the flexible member 81, such as disconnection and clogging of pipe, are unlikely to occur.

In the robot 100, the fifth arm 15 (B-arm) includes the hole 153 communicating with the through-hole 161 through which the flexible member 81 can be inserted and which is included in the sixth arm 16 (C-arm). Then, the through-hole 161 included in the sixth arm 16 (C-arm), the hole 153 included in the fifth arm 15 (B-arm), and the clamp 90 (more specifically, clamp hole 91 of the clamp 90) are provided side by side along the axial direction of the rotation axis O6 (C-rotation axis). Furthermore, the through-hole 161, the hole 153, and the clamp 90 are disposed in this order.

With this configuration, the flexible member 81 included in the end effector 80 attached to the sixth arm 16 can be easily inserted into the through-hole 161, the hole 153, and the clamp hole 91 of the clamp 90, so that the flexible member 81 can be easily routed.

The hole 153 and the clamp 90 may not be along the axial direction of the rotation axis O6 (C-rotation axis), respectively. Although the number of each of the through-hole 161, the hole 153, and the clamp 90 is one in the drawing, but two or more may be present. Also, the shape and disposition of the through-hole 161, the hole 153, and the clamp 90 are not limited to those illustrated.

Furthermore, the fifth arm 15 (B-arm) includes the first area 151 connected to the fourth arm 14 (A-arm) and the second area 152 including the hole 153. The first area 151 and the second area 152 are connected so that both ends (both openings) of the hole 153 open to the outside (outside of the fifth arm 15). In the embodiment, one opening of the hole 153 communicates with the through-hole 161, and the other opening of the hole 153 faces the portion 141 on the base end side of the fourth arm 14.

The first area 151 and the second area 152 described as above are provided so as to make it possible to realize the fifth arm 15 which is cantilevered off the fourth arm 14 and includes the hole 153 communicating with the through-hole 161 included in the sixth arm 16 with a relatively simple configuration. For that reason, the flexible member 81 can be easily pulled out from the hole 153 through the through-hole 161, so that the flexible member 81 can be easily routed to the sixth arm 16, the fifth arm 15, and the fourth arm 14. As described above, the clamp 90 is provided in the first area 151.

With this configuration, the through-hole 161, the hole 153, and the clamp hole 91 can be arranged side by side relatively easily in the axial direction of the rotation axis O6. Since the position of the flexible member 81 pulled out from the hole 153 through the through-hole 161 can be suitably restricted (fixed) by the clamp 90, it is possible to more effectively reduce the deflection of the flexible member 81 when the fifth arm 15 rotates.

The clamp 90 may be provided, for example, in the second area 152. However, also in that case, it is preferable that the clamp hole 91 is provided along the axial direction of the rotation axis O6 (C-rotation axis) in order to facilitate routing of the flexible member 81.

As described above, the restriction 70 is provided at the connection portion between the fourth arm 14 and the fifth arm 15. The restriction 70 includes the first engagement portion (first restriction) 71 and the second engagement portion (second restriction) 72, and the second engagement portion 72 is a projection provided on the inner surface 1510 of the fifth arm 15 (B-arm). Specifically, in order to reinforce the outer wall portion 1511 and the inner wall portion 1512 of the first area 151, the second engagement portion 72 is constituted by the rib provided therebetween.

With this configuration, it is possible to constitute the restriction 70 which is not exposed to the outside of the robot arm 10 with a relatively simple configuration. That is, a part of the restriction 70 can be easily formed by devising a rib for reinforcing the mechanical strength of the first area 151 separately without adding a member for the restriction 70.

Furthermore, as described above, the first engagement portion 71 is a projection provided on the outer surface 1410 of the fourth arm 14 (A-arm).

With this configuration, the first engagement portion 71 that can be engaged with the second engagement portion 72 can be easily formed (reasonably in design), so that it is possible to constitute the restriction 70 which is not exposed to the outside of the robot arm 10 with a relatively simple configuration.

The "restriction" is not limited to the configuration of the illustrated restriction 70 as long as it can restrict the rotation of the fifth arm 15 (B-arm) with respect to the fourth arm 14 (A-arm). That is, the "first engagement portion" and the "second engagement portion" are not limited to the configurations of the first engagement portion 71 and the second engagement portion 72 that are illustrated, respectively. For example, the "first engagement portion" may be a projection provided on the inner surface of the fourth arm 14, and the "second engagement portion" may also be a projection provided on the outer surface of the fifth arm 15. The "first engagement portion" may be a projection provided on the inner surface of the fourth arm 14, and the "second engagement portion" may also be a projection provided on the inner surface of the fifth arm 15.

The "restriction" may be provided on arms other than the fourth arm 14 and the fifth arm 15. In this case, the "restriction" can be configured to be covered with an exterior member (outer wall portion) of any one of the first arm 11, the second arm 12, the third arm 13, the fourth arm 14, the fifth arm 15, and the sixth arm 16 that constitute the robot arm 10 so as not to be exposed to the outside of the robot arm 10. Specifically, the "restriction" may have any configuration as long as it restricts the rotation of the arm on the tip end side with respect to the arm on the base end side. The "restriction" can be formed by providing the "first engagement portion" in any one of the arms and the "second engagement portion" in the other arm.

As described above, the control board 51, the power supply board 52, and the plurality of drive boards 53 are disposed in the robot main body 1, respectively, and various wirings (not illustrated) (wirings of drive system and signal system) for driving the robot arm 10 are disposed in the robot main body 1. For that reason, since only the flexible member 81 for the end effector 80 can be disposed externally, it is possible to prevent mixing of the flexible member 81 and various wires for driving the robot arm 10 and it is possible to reduce such entanglement and the like. For that reason, damage to the flexible member 81 can be further reduced.

The robot 100 according to the embodiment has been described as above. The robot 100 described as above configuration has a fan-less structure. That is, the robot main body 1 is not provided with a fan for generating airflow in the internal space S1. Thereby, it is possible to realize, for example, a robot 100 excellent in sealing performance. As described above, the power supply board 52 includes a converter that converts an AC voltage output from an external power supply into a DC voltage (relatively low driving voltage) and as a result, a fan-less structure can be realized. The robot 100 may be provided with a fan (not illustrated).

Second Embodiment

Next, a second embodiment of the invention will be described.

Figure 15:
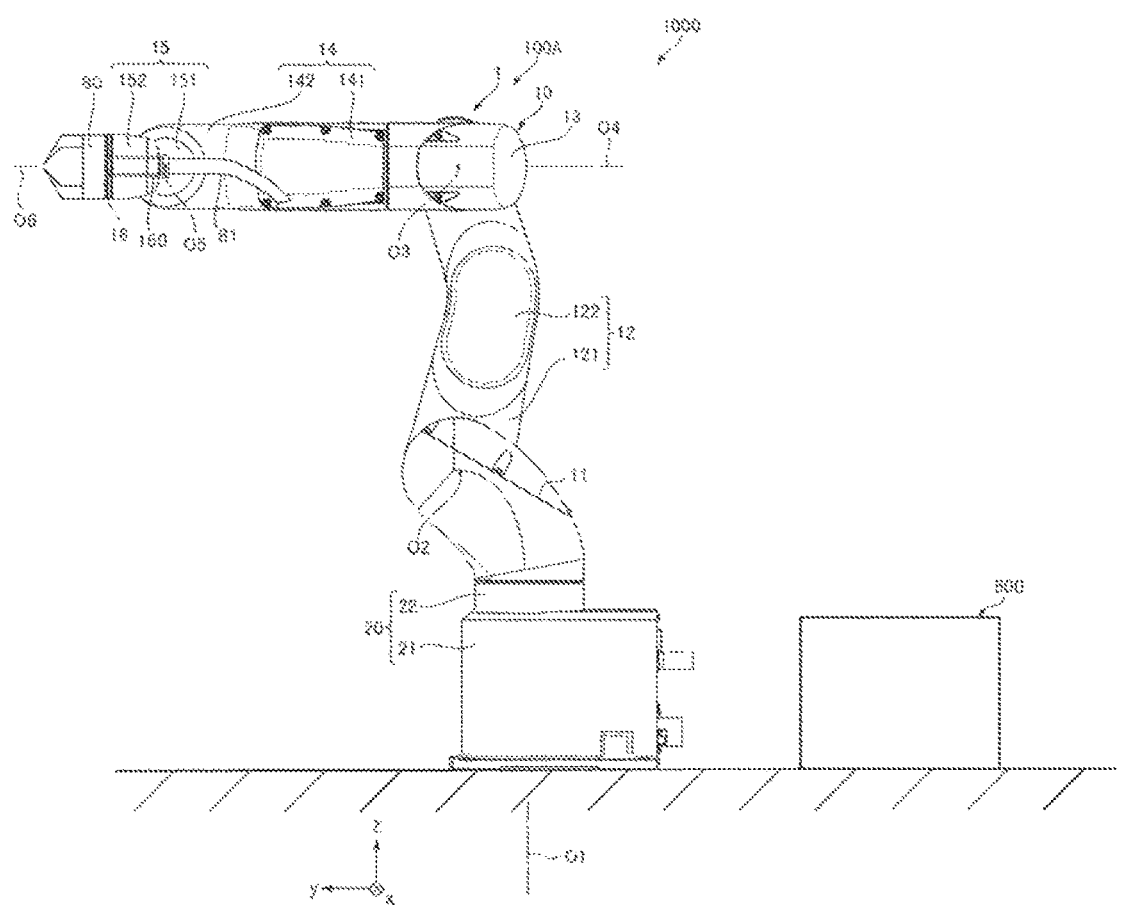
FIG. 15 is a view schematically illustrating a robot system partially according to a second embodiment.
Figure 16:
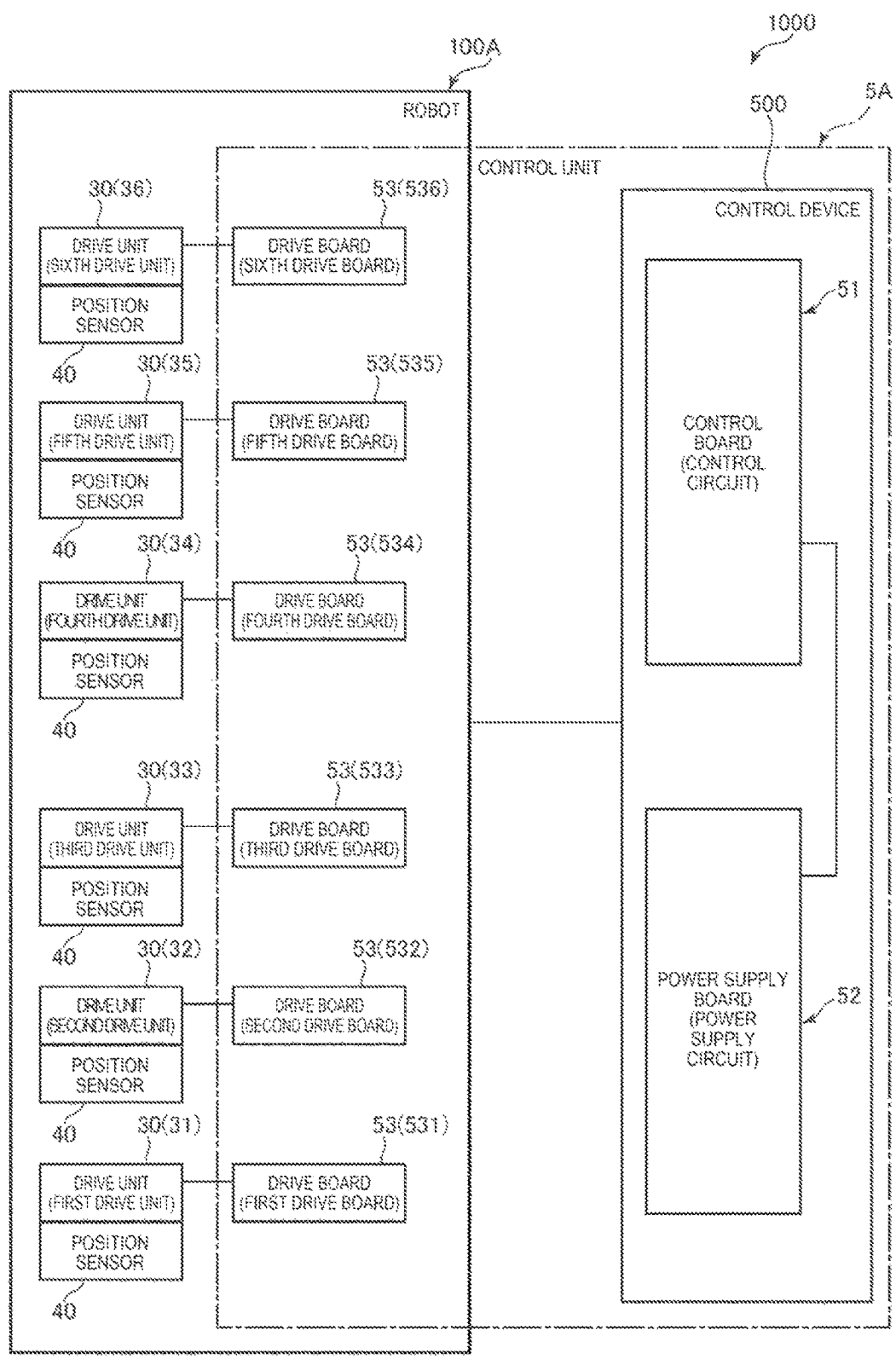
FIG. 16 is a block diagram of the robot system illustrated in FIG. 15.

FIG. 15 is a view schematically illustrating the robot system partially according to a second embodiment. FIG. 16 is a block diagram of the robot system illustrated in FIG. 15.

This embodiment is mainly the same as the embodiment (robot 100) described above except that the control device (controller) configured to include the control board and the power supply board is mainly provided separately from the robot main body (robot). In the following description, with respect to the second embodiment, differences from the embodiment described above will be mainly described, and description of the same matters will be omitted or made briefly using the same reference numerals.

As illustrated in FIG. 15 and FIG. 16, in the embodiment, a control device 500 (controller) is provided separately from the robot 100A. In the embodiment, a description will be made on a robot system 1000 which includes a robot 100A and a control device 500 (controller) provided separately therefrom.

The robot system 1000 includes a robot 100A including the robot main body 1, the plurality of drive units 30, the plurality of position sensors 40, and a plurality of drive boards 53, and the control device 500 including the control board 51 and the power supply board 52. The robot 100A and the control device 500 may be interconnected in a wired or wireless connection manner. The control device 500 and the plurality of drive boards 53 constitute a control unit 5A. The control unit 5A exhibits the same function as the control unit 5 in the first embodiment.

Such a robot system 1000 includes a robot 100A including the robot arm 10 that includes the fourth arm 14 (A-arm) which is rotatable around the rotation axis O4 (A-rotation axis), the fifth arm 15 (B-arm) which is cantilevered off the fourth arm 14 (A-arm) and is rotatable around the rotation axis O5 (B-rotation axis), the sixth arm 16 (C-arm) which is connected to the B-arm, to which the end effector 80 can be attached, and which is rotatable around the rotation axis O6 (C-rotation axis), and the control device 500 provided separately from the robot 100A and including the control board 51 and the power supply board 52 for supplying electric power to the control board 51. The fourth arm 14 (A-arm) includes the first engagement portion 71. The fifth arm 15 (B-arm) includes the clamp 90 that restricts the position of the flexible member 81 including at least one of the wiring and pipe connected to the end effector 80 and the second engagement portion 72 capable of engaging with the first engagement portion 71. The sixth arm 16 (C-arm) includes the through-hole 161 through which the flexible member 81 can be inserted and which penetrates the sixth arm 16 along the axial direction of the rotation axis O6 (C-rotation axis). The robot arm includes the restriction 70 which is configured to include the first engagement portion 71 and the second engagement portion 72 and restricts rotating of the fifth arm (B-arm) with respect to the fourth arm (A-arm) by engagement of the first engagement portion 71 with the second engagement portion 72. The restriction 70 is not exposed to the outside of the robot arm 10 in a state where the fourth arm (A-arm) and the fifth arm (B-arm) are connected to each other.

Even with such a robot system 1000, similarly to the first embodiment, it is possible to prevent the deflection of the flexible member 81 or interference with the flexible member 81 and the peripheral device due to the operation of the robot arm 10 (particularly, fifth arm 15 and sixth arm 16). Further, the flexible member 81 can be easily routed, and damage to the flexible member 81 can also be reduced.

Although the robot and the robot system according to the invention have been described based on the illustrated embodiments, the invention is not limited thereto, and the configuration of each portion can be replaced with any configuration having the same function. Any other constituent element may be added to the invention. Further, each embodiment may be appropriately combined.

In the embodiments described above, the single-arm robot is exemplified as the robot according to the invention, but the robot is not limited to the single-arm robot, and may be another robot such as a dual-arm robot or the like. For example, two or more robot arms may be provided to the base.

Further, in the embodiments described above, the fourth arm constitutes the A-arm, the fifth arm constitutes the B-arm, and the sixth arm constitutes the C-arm, but the A-arm, the B-arm, and the C-arm are not limited thereto.

The entire disclosure of Japanese Patent Application No. 2017-213523, filed Nov. 6, 2017, is expressly incorporated by reference herein.

What is claimed is:
1. A robot comprising:
a robot main body including an A-arm which rotates around an A-rotation axis, a B-arm which is cantilevered off the A-arm and rotates around a B-rotation axis, and a C-arm which is connected to the B-arm, to which an end effector is attached, and which rotates around a C-rotation axis,
wherein the A-arm includes a first restriction that is not exposed to the outside of the robot main body,
the B-arm includes a clamp which is connected to the end effector and restricts a position of a flexible wiring or pipe, a second restriction that is not exposed to the outside of the robot main body and contacts on the first restriction, and a hole through which the wiring or the pipe is inserted,
the C-arm includes a through-hole which penetrates the C-arm along the axial direction of the C-rotation axis and through which the wiring or the pipe is inserted,
in a case where the B-arm rotates around the B-rotation axis, the first restriction and the second restriction contact each other to restrict rotation of the B-arm with respect to the A-arm, and
the through-hole included in the C-arm, the hole included in the B-arm, and the clamp are provided side by side along the axial direction of the C-rotation axis.
2. The robot according to claim 1,
wherein the B-arm includes a first area connected to the A-arm and a second area including the hole, and
the first area and the second area are connected so that both ends of the hole open to the outside.
3. The robot according to claim 2,
wherein the clamp is provided in the first area.
4. The robot according to claim 1,
wherein the second restriction is a projection provided on an inner surface of the B-arm.
5. The robot according to claim 4,
wherein the first restriction is a projection provided on an outer surface of the A-arm.
6. The robot according to claim 1, further comprising:
a control board and a power supply board that supplies electric power to the control board, which are provided in the robot main body.

* * * * *